(12) United States Patent
Park

(10) Patent No.: US 12,009,643 B2
(45) Date of Patent: Jun. 11, 2024

(54) POWER DISTRIBUTION DEVICE FOR DISTRIBUTION BOARD

(71) Applicant: SANGDO ELECTRIC CO., LTD., Paju-si (KR)

(72) Inventor: Jaehyun Park, Seoul (KR)

(73) Assignee: SANGDO ELECTRIC CO., LTD., Paju-si (KR)

( * ) Notice: Subject to any disclaimer, the term of this patent is extended or adjusted under 35 U.S.C. 154(b) by 0 days.

(21) Appl. No.: 18/482,177

(22) Filed: Oct. 6, 2023

(65) Prior Publication Data

US 2024/0079859 A1 Mar. 7, 2024

Related U.S. Application Data

(63) Continuation of application No. PCT/KR2022/009244, filed on Jun. 28, 2022.

(30) Foreign Application Priority Data

Oct. 1, 2021 (KR) .......................... 10-2021-0130695
Oct. 1, 2021 (KR) .......................... 10-2021-0130697

(51) Int. Cl.
*H02B 1/38* (2006.01)
*H02B 1/20* (2006.01)
*H02B 1/46* (2006.01)

(52) U.S. Cl.
CPC ................ *H02B 1/46* (2013.01); *H02B 1/20* (2013.01); *H02B 1/38* (2013.01)

(58) Field of Classification Search
None
See application file for complete search history.

(56) References Cited

U.S. PATENT DOCUMENTS

| 4,358,815 | A | * | 11/1982 | Koslosky | ............... | H02B 1/056 |
| | | | | | | 361/636 |
| 4,783,718 | A | * | 11/1988 | Raabe | .................... | H02B 1/056 |
| | | | | | | 361/652 |
| 5,466,974 | A | * | 11/1995 | Sutrina | .................... | H02B 1/20 |
| | | | | | | 307/38 |
| 6,229,692 | B1 | * | 5/2001 | Stendardo | .............. | H02B 1/056 |
| | | | | | | 174/68.2 |

(Continued)

FOREIGN PATENT DOCUMENTS

| KR | 10-0748397 B1 | 8/2007 |
| KR | 10-2007-0106054 A | 11/2007 |

(Continued)

*Primary Examiner* — Courtney L Smith
(74) *Attorney, Agent, or Firm* — NKL Law; Byungwoong Park

(57) ABSTRACT

The provided is a power distribution device for a distribution board. The power distribution device distributes power to and connects a main circuit breaker, branch circuit breakers, an additional output terminal circuit breaker, and an additional output terminal circuit breaker, the power distribution device for a distribution board includes an upper housing, a lower housing installed on a floor, a connection module installed in a vertical direction at a side of the lower housing adjacent to the main circuit breaker, and the connection module includes a connection terminal, a connection member, a coupling member, an electrically conducting the fastening member, and a ring-shaped nut member.

3 Claims, 23 Drawing Sheets

(56) References Cited

U.S. PATENT DOCUMENTS

2009/0185335 A1* 7/2009 Kwon ................... H02B 1/056
 361/643
2010/0226113 A1* 9/2010 Kwon ...................... H02B 1/20
 361/823

FOREIGN PATENT DOCUMENTS

| KR | 10-2008-0030417 A | 4/2008 |
|----|-------------------|--------|
| KR | 10-0942605 B1 | 2/2010 |
| KR | 10-2011-0042777 A | 4/2011 |
| KR | 10-1055421 B1 | 8/2011 |
| KR | 10-1176626 B1 | 8/2012 |
| KR | 10-2016-0024571 A | 3/2016 |
| KR | 10-2017-0034123 A | 3/2017 |
| KR | 10-2017-0142076 A | 12/2017 |
| KR | 10-1899350 B1 | 9/2018 |
| KR | 10-2019-0047177 A | 5/2019 |
| KR | 10-2004696 B1 | 7/2019 |
| KR | 10-2389977 B1 | 4/2022 |
| KR | 10-2389978 B1 | 4/2022 |

\* cited by examiner

POWER DISTRIBUTION DEVICE FOR DISTRIBUTION BOARD

TECHNICAL FIELD

The present invention relates to a power distribution device for a distribution board, and more particularly, to a power distribution device for a distribution board that implements a connection terminal (a connection terminal having a connection hole formed at one side of the connection terminal, hereinafter, referred to as a connection module) using a connection hole connection method for maintaining a degree of parallelization, allows the connection terminals with different heights to be used as a single height adjustment support, uses a rotary cover to protect an opened output terminal formed on an outer housing of the power distribution device for a distribution board, uses a safety cover to protect an exposed terminal of the connection module, and implements a housing alignment connection structure capable of aligning and connecting the two or more continuous power distribution devices for a distribution board.

BACKGROUND ART

In general, a distribution board has a housing (a main housing and a sub-housing are collectively referred to as a housing) in which a main wiring circuit breaker and a leakage circuit breaker are disposed, terminals for the main wiring circuit breaker and the leakage circuit breaker are disposed, and busbars for electrically connecting the main wiring circuit breaker and the leakage circuit breaker are disposed. The distribution board serves to supply electric power or cut off the supply of electric power and also serves to prevent safety accidents such as electric leakage or electric shock by preventing lines connected to the circuit breakers from being exposed.

A busbar block for power distribution (hereinafter, referred to as a power distribution device for a distribution board) in the related art serves to electrically connect horizontal connection terminals and vertical connection terminals disposed in a housing and to distribute electric power supplied from the outside. The busbar block includes main busbar connection terminals connected to a main wiring circuit breaker and configured to guide electric power, a sub-busbar connection terminal connected to the main busbar connection terminals configured to distribute and supply the electric power to a branch circuit breaker, and a busbar assembly (hereinafter, referred to as a power distribution device) configured to connect the main busbar connection terminal and the sub-busbar connection terminal.

First, in the power distribution device in the related art, the terminals of the output terminals connected from the main circuit breaker each have a stepped structure, and the corresponding terminals are fastened while overlapping one another in an upward/downward direction, which causes a problem in that a degree of parallelization of the terminals cannot be maintained.

That is, in order to implement the compatibility with various types of circuit breakers, a degree of parallelization, in which a height of the connection terminal for a circuit breaker is equal to a height of the connected connection terminal, needs to be maintained so that complicated assembling structures of the connection structure and assembling methods may be stable, and an electrically conducting state may also be stable. However, in the related art, because the connection terminals of the busbar assembly (power distribution device) and the circuit breaker are not equal in terminal heights to one another, there is a problem in that the connection terminals, which constitute the power distribution device (busbar assembly), need to be manufactured and used separately so that the connected terminals deform stepped portions one by one and connected and fastened while overlapping one another. In particular, in the case of a particular circuit breaker, there is a problem in that heights of the connection terminals are not matched with one another, and the connection terminals cannot be used.

For this reason, the connection terminals having stepped portions need to be manufactured by using separate molds in order to match the heights of the input and output terminals of the various types of circuit breakers, which increases manufacturing costs and degrades productivity and economic feasibility.

Second, the connection terminal of the power distribution device for a distribution board in the related art has a connection structure that protrudes downward and is formed by forming a burring at a lower side to form a fastening hole in a connection portion of the terminal in order to increase a connection force. For this reason, in addition to the problem caused by the stepped portion, the lower protruding portion also causes problems in that a risk of electric shock occurs because of unnecessary contact caused by the lower protruding portion, a size of the power distribution device (busbar assembly) needs to be increased by expansion of lower intervals, and the number of structures as well as the number of manufacturing processes are increased. Therefore, a terminal connection structure having no burring protruding portion is required for the connection terminal of the power distribution device for a distribution board.

Third, in the busbar assemblies (power distribution devices) for a distribution board that are generally used, housings for protecting and covering outer portions of the busbar assemblies are integrally formed, and the busbar assemblies are mounted and inserted into bottom portions thereof and used. Further, a height adjustment support, which protects an exposed portion, except for the terminal, to prevent the terminal part from being exposed, is used by being installed to be matched with the height of the output terminal. The height adjustment support is protected as a height adjustment support to prevent a human body from directly touching the connection portion through a portion exposed to a lower end of the busbar assembly (power distribution device) and prevent a risk of the occurrence of static electricity, an electric leakage, and a short circuit caused by dust or foreign substances trapped in the connection portion. However, in the related art, two types of height adjustment supports need to be manufactured, and the height adjustment supports are manufactured and used to conform to two different heights of the output terminal parts, which causes inconvenience.

Fourth, in the power distribution devices for a distribution board that are generally used, the housings are provided to protect and cover the outer portions of the power distribution devices, and cover means are used by being installed on rear surfaces of the housings to prevent the connection terminal parts of the power distribution devices exposed to the output side from being exposed.

However, the cover means for protecting the exposed terminal of the power distribution device for a distribution board in the related art is configured such that a separate component is manually mounted or separated to cover an opened space of the exposed terminal. For this reason, an installed state is separated by a small amount of vibration or the like. Further, even when a catching projection or the like for preventing the separation is provided and supports the cover means, the catching projection is abraded and easily separated because of the repeated use. Therefore, a rotary cover means for preventing the separation is required to cover the opened space of the exposed terminal.

Fifth, because the exposed terminal part of the connection terminal on the rear surface of the power distribution device for a distribution board in the related art is kept in an exposed state without change, the human body may touch the connection terminal or dust or foreign substances are trapped in the connection terminal, which causes a risk of the occurrence of static electricity, an electric leakage, and a short circuit. Therefore, there is a need for a connection portion safety cover of the power distribution device for a distribution board that covers the exposed portion.

Sixth, the two or more power distribution devices for a distribution board in the related art are connected and installed continuously in a vertical direction. In order to align the power distribution devices for a distribution board in the vertical direction, a line is formed, or a linear guide means or the like is accessorily formed on a base of the distribution board. Accordingly, there is a need for a housing alignment connection structure that constitutes the power distribution device for a distribution board.

RELATED ART

Patent Documents (Patent Document 1) Korean Patent No. 10-2004696 (published on Jul. 29, 2019)
(Patent Document 2) Korean Patent No. 10-1055421 (published on Aug. 9, 2011)
(Patent Document 3) Korean Patent No. 10-0748397 (published on Aug. 10, 2007)
(Patent Document 4) Korean Patent No. 10-1176626 (published on Aug. 23, 2012)
(Patent Document 5) Korean Patent Application Laid-Open No. 10-2007-0106054 (published on Nov. 1, 2007)
(Patent Document 6) Korean Patent Application Laid-Open No. 10-2017-0142076 (Dec. 27, 2017)

SUMMARY

The present invention has been made in an effort to solve the above-mentioned problems of the power distribution device for a distribution board in the related art, and an object of the present invention is to provide a connection module that solves the above-mentioned problems by means of a sleeve connection-type connection terminal capable of maintaining a degree of parallelization (a connection terminal having a connection hole at one end thereof so that the other end of the connection terminal may be inserted into the connection hole, hereinafter, referred to as a connection module).

Another object of the present invention is to provide the power distribution device for a distribution board that reduces manufacturing costs caused by an increase in number of processing processes by solving the problem with the maintenance of the degree of parallelization caused by Z-bending of the connection terminal in the related art, the problem of the increase in contact resistance (line contact), and the problem caused when burring processing is performed on a fastening terminal.

Still another object of the power distribution device for a distribution board of the present invention is to provide a housing assembling method that assembles and couples upper and lower cover housings in a state in which an internal connection terminal is installed in the power distribution device.

Yet another object of the power distribution device for a distribution board of the present invention is to provide a connection module in which an end of a connection end portion is processed to be conveniently inserted into a connection hole at the other end of the connection module by improving the connection end portion of one end of the connection module.

Still yet another object of the power distribution device for a distribution board of the present invention is to provide a lower housing having a fastening groove portion to which a stem having a screw thread of the fastening member passing through the connection module, which improves releasing, is securely fastened and fixed to prevent abrasion in order to fasten the connection module to the lower housing that defines the bottom side at the time of implementing a structure for separating and coupling the housing.

Another further object of the power distribution device for a distribution board of the present invention is to use the power distribution device in accordance with a height of an output terminal by conveniently changing upper and lower surfaces in accordance with the height of the exposed output terminal by using a single height adjustment support by improving a problem in which two types of height adjustment supports are used one by one in accordance with a height of the output terminals in two directions exposed to the outside of the outer housing.

Still another further object of the power distribution device for a distribution board of the present invention is to provide a rotary cover that implements a simple structure by solving the problem with the protection cover means in the related art for protecting the exposed terminal opened at one end of an upper portion of the installed and fixed housing, such that the rotary cover may be rotated at a predetermined angle to maintain an opened state and closed to an original position after terminal connection, and also provide a cover mean that allows the rotary cover to fix a closed state and an opened state at a predetermined angle and rotate stepwise.

Yet another further object of the power distribution device for a distribution board of the present invention is to provide a component that penetrates and is safely in contact with fastening holes formed in first and second connection members of the connection module, thereby preventing a short circuit accident caused by inadvertent contact with a conductive member, contact with an operator, and rainwater in an opened state of the distribution board caused by an exposed terminal having no connection between the housings that constitute the power distribution device for a distribution board.

Still yet another further object of the power distribution device for a distribution board of the present invention is to provide a structure in which the housings are stably connected continuously and aligned as a tip portion protruding from a housing front end of a male connection protruding portion is inserted into a female connection groove portion as a housing alignment connection structure of the power distribution device, such that an interval between end pieces is decreased, and the tip portion is narrowed and then inserted, attached, and supported by being caught by an inner projection portion of the female connection groove portion having a groove shape.

Technical Solution

To achieve the above-mentioned objects, an embodiment of the present invention provides a power distribution device for a distribution board, the power distribution device including: a housing including an upper housing configured to protect an upper portion of the power distribution device for a distribution board, and a lower housing configured to support and protect a lower portion of the power distribution device for a distribution board; a connection module disposed in a space in the housing and integrated with connection terminals to receive power of a main circuit breaker and a branch circuit breaker; and the connection terminal fastened to the connection module and configured to distribute power, in which the connection module includes: the connection terminal having first and second ends and a plate-shaped surface having a predetermined width and extending in a length direction between the first and second ends, the plate-shaped surface, between the first and second ends, having rivet coupling holes and connection holes; a connection member including first and second connection members coupled to cover the second end of the connection terminal in an upward/downward direction so that the second end has a connecting and electrically conducting connection hole, the first and second connection members having two opposite edges corresponding to each other, open ends having the connection holes, fastening holes, and coupling holes; coupling members configured to fix and penetrate the coupling holes of the connection member and the rivet coupling holes of the connection terminal; an electrically conducting fastening member fastened while penetrating the connection hole of the second end and the upper and lower fastening holes and configured to allow the second end of the connection terminal to be inserted into the connection hole; and a ring-shaped nut member fixed to a fastening groove portion of the lower housing so that the electrically conducting fastening member is fastened and fixed to the ring-shaped nut member while penetrating the fastening holes and the connection hole.

To achieve the above-mentioned objects, another embodiment of the present invention provides a power distribution device for a distribution board, the power distribution device including: a housing configured to cover an outer portion of the distribution device; a connection module disposed in a space in the housing and connected to a busbar connection terminal for a main circuit breaker to receive power of the main circuit breaker; a busbar connection terminal stacked on and coupled to the connection module and configured to distribute power of the main circuit breaker to a branch circuit breaker and an additional output circuit breaker; and a height adjustment support having coupling grooves formed in accordance with different terminal heights of branching-connection terminals, in which the height adjustment support includes: a first coupling groove and a first coupling protrusion formed along a first surface so as to be matched with a height of a first terminal of the branching-connection terminal; and a second coupling groove and a second coupling protrusion formed along a second surface so as to be matched with a height of a second terminal of the branching-connection terminal, and in which the positions of the first and second surfaces are changed so that the first coupling groove and the second coupling protrusion of the first surface are installed at a height of the first terminal, and the second coupling groove and the second coupling protrusion of the second surface are positioned at a height of the second terminal.

To achieve the above-mentioned objects, still another embodiment of the present invention provides a power distribution device for a distribution board, the power distribution device including: a housing including an upper housing configured to protect an upper portion of the power distribution device for a distribution board, and a lower housing configured to support and protect a lower portion of the power distribution device for a distribution board; a connection module disposed in a space in the housing and integrated with connection terminals to receive power of a main circuit breaker and a branch circuit breaker; the connection terminal fastened to the connection module and configured to distribute power; and a rotary cover configured to be rotated and opened when a second end of the connection terminal of the power distribution device for a distribution board is connected to a connection hole of another power distribution device for a distribution board in a state in which the housing is opened; in which the rotary cover includes: a first surface portion extending in a plate shape in a length direction; a second surface portion having a plate shape and connected in a "¬" shape to the first surface portion; "¬"-shaped rotation surface portions configured to cover two opposite surfaces of each of the first and second surface portions; and hinge shafts on which two opposite surfaces of the rotation surface portion are axially fixed to be rotatable; in which the upper housing includes a slip recessed portion, and in which the slip recessed portion includes: a hinge shaft groove in which the hinge shaft is rotatably installed; and an angle fixing groove portion having first and second groove portions in which stopping protrusions are positioned to fix an opened or closed state of the rotary cover.

To achieve the above-mentioned objects, yet another embodiment of the present invention provides a power distribution device for a distribution board, the power distribution device including: a housing configured to cover an outer portion of the power distribution device; a connection module disposed in a space in the housing and connected to a busbar connection terminal for a main circuit breaker to receive power of the main circuit breaker; a busbar connection terminal stacked on and coupled to the connection module and configured to distribute power of the main circuit breaker to a branch circuit breaker and an additional output circuit breaker; and a safety cover seated on a stepped placement portion to which a first end of the connection module at a front side of the housing, the safety cover being configured to cover connection holes of the first end of the connection module, in which the safety cover includes: a front cover portion having a simultaneously plate shape to cover the plurality of connection holes in a front surface; an upper cover portion bent at a right angle from the front cover portion and protruding in a fork shape while having seating hole portions alternately formed in a plate-shaped surface; and a fastening hole cover portion disposed immediately below the upper cover portion and having a seating hole configured to be in close contact with and cover a head portion of a fastening member.

The power distribution device for a distribution board according to the embodiment of the present invention to achieve the above-mentioned objects may include: the housing configured to cover an outer portion of the power distribution device; a connection module disposed in a space in the housing and connected to a busbar connection terminal for a main circuit breaker to receive power of the main circuit breaker; a busbar connection terminal stacked on and coupled to the connection module and configured to distribute power of the main circuit breaker to a branch circuit breaker and an additional output circuit breaker; and connection holder parts protruding from front and rear ends of the housing to connect the housings, in which the connection holder part includes: male connection protruding portions protruding from two opposite sides of the front end of the housing, having tip portions sharply formed on a support protruding from the front end of the housing, the male connection protruding portions having x end pieces installed side by side at an interval ("c"); and female connection groove portions recessed at two opposite sides of the rear end of the housing so as to be opened upward and coupled by being caught by projection portions as the male connection protruding portions are inserted and attached into the female connection groove portions.

Advantageous Effects

The power distribution device for a distribution board of the present invention provides the effect that it is possible to solve the problem of the power distribution devices for a distribution board in the related art and provide the connection module configured as the connection terminal having the connection hole at the end thereof and having the other end capable of being inserted into the connection hole, thereby solving the problem in which the stepped portion is formed at the end of the connection terminal of the power distribution device for a distribution board in the related art.

The power distribution device for a distribution board of the present invention provides the effect that it is possible to provide the connection means of the power distribution device for a distribution board that has the improved connection module having the convenient assembling structure by providing the coupling structure of the upper and lower connection member for forming the connection hole as the connection terminal that allows the connection end portion at one end of the sleeve connection structure, which has the connection hole at one end thereof and maintains the degree of parallelization, to be conveniently inserted into the connection hole of the other end.

The power distribution device for a distribution board of the present invention provides the effect that the improved structural may reduce manufacturing costs caused by an increase in number of processing processes by solving the problem with the maintenance of the degree of parallelization caused by Z-bending of the connection terminal in the related art, the problem of the increase in contact resistance (line contact), and the problem caused when burring processing is performed on a fastening terminal.

The power distribution device for a distribution board of the present invention implements the connection module having the connection terminal, in which the degree of parallelization is maintained, and provides the housing assembling method that assembles and couples the housings for covering the upper and lower portions in the state in which the internal connection terminal is installed.

The power distribution device for a distribution board of the present invention provides the lower housing having the fastening groove portion fixed by the fastening member that improves releasing and prevents fastening abrasion of the fastening structure of the connection module on the lower housing that defines the bottom side at the time of implementing the structure for separating and coupling the housing.

The height adjustment support of the power distribution device for a distribution board of the present invention is provided as the height adjustment support of the power distribution device for a distribution board that may be used in accordance with the height of the output terminal by conveniently changing the upper and lower surfaces in accordance with the height of the exposed output terminal by using the single height adjustment support by improving the problem in which the two types of height adjustment supports are used one by one in accordance with the height of the output terminals in two directions exposed to the outside of the outer housing.

The improvement is obtained in that the rotary cover of the power distribution device for a distribution board of the present invention solves the problem with the protection cover means in the related art for protecting the exposed terminal opened at the upper portion of the upper housing as the rotary cover rotates between the angle fixing groove portions in the opened state after the rotation at a predetermined angle and then the stopping protrusions in the first and second fixing groove portions are stably inserted and attached, such that the angle fixed state is constantly maintained.

The rotary cover of the power distribution device for a distribution board of the present invention implements the simple structure by solving the problem with the protection cover means in the related art for protecting the exposed terminal opened at one end of the upper portion of the installed and fixed housing, such that the rotary cover may be rotated at a predetermined angle to maintain the opened state and closed to the original position after the terminal connection, and the rotary cover of the power distribution device for a distribution board also generates click sound while rotating at an angle and rotates stepwise.

The improvement is obtained in that the connection portion safety cover of the power distribution device for a distribution board of the present invention penetrates and is safely in contact with fastening holes formed in the first and second connection members of the connection module, thereby preventing a short circuit accident caused by inadvertent contact with the conductive member, contact with the operator, and rainwater in the opened state of the distribution board caused by the exposed terminal having no connection between the housings that constitute the power distribution device for a distribution board.

The housing alignment connection structure of the power distribution device for a distribution board of the present invention has the structure in which the tip portion protruding from the housing front end of the male connection protruding portion is inserted into the female connection groove portion, such that the interval between the end pieces is decreased, and the tip portion is narrowed and then inserted, attached, and supported by being caught by the inner projection portion of the female connection groove portion having a groove shape, thereby stably and continuously connecting and aligning the housings.

DESCRIPTION OF MAIN REFERENCE NUMERALS OF DRAWINGS

Figure 1:
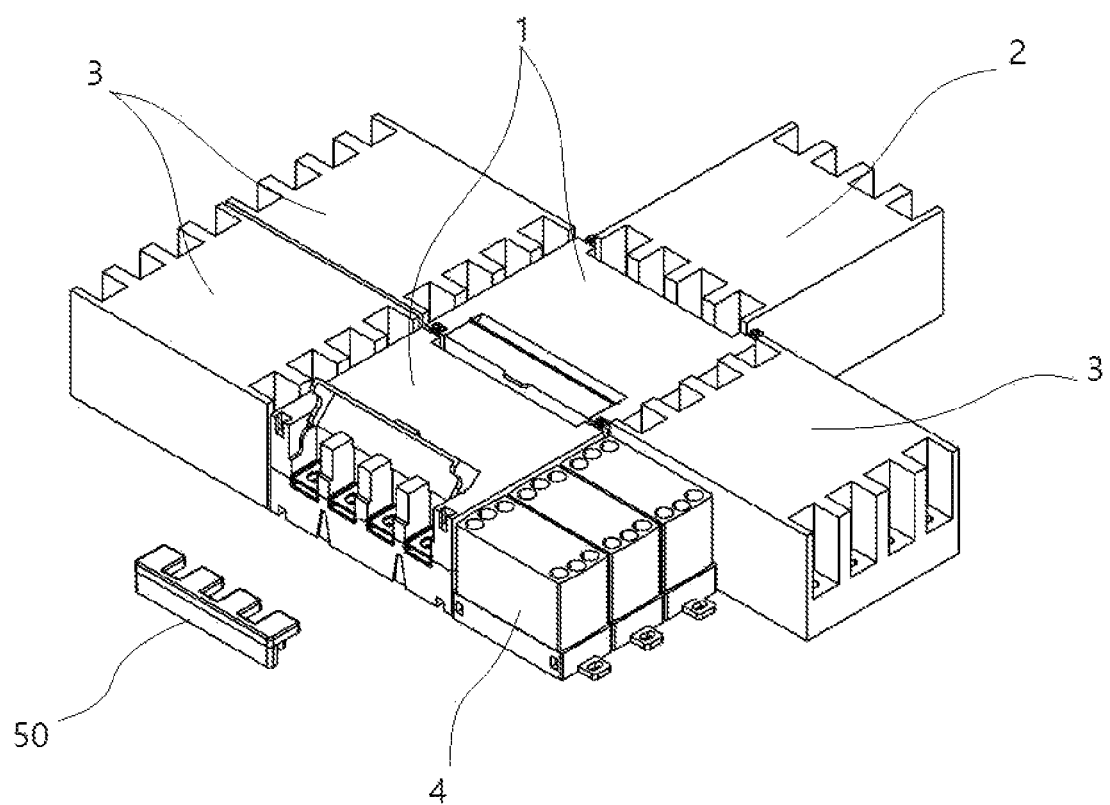
FIG. 1 is a coupled perspective view of an entire distribution board to which a power distribution device for a distribution board of the present invention is applied.

1: Power distribution device for distribution board
2: Main circuit breaker
2a: Busbar terminal for main circuit breaker
3: Branch circuit breaker
3a: Busbar terminal for branch circuit breaker
4: Additional circuit breaker
41: Busbar connection terminal
411: First output terminal
412: Second output terminal
100: Housing
101: Upper housing
103: Lower housing
103a: Fastening groove portion
10: Connection module
11: Connection terminal
111: First end
112: Second end
113: Connection hole
12: Connection member
121: First connection member
121a: Two opposite edges
122: Second connection member
122a: Two opposite edges
123: Fastening hole
124: Connection hole
124a, 124b: Open end
125: Coupling hole
13: Coupling member
14: Electrically conducting fastening member
141: Head portion
142: Stem portion
15: Ring-shaped nut member
20: Height adjustment support
201: First surface
202: Second surface
21, 23: First and second coupling grooves
22, 24: First and second coupling protrusions
30: Rotary cover
31: Rotation surface portion
32: Hinge shaft
32a: Sound generation protrusion
33: Stopping protrusion
34: First surface portion
35: Second surface portion
37: Hinge shaft groove
38: Slip recessed portion
39: Angle fixing groove portion
391: First groove
392: Second groove
111: First end
112: Second end
112a: Inclined surface
112b: Tip surface
112c: Curved portion
113: Contact connection hole
114: Coupling rivet hole
50: Safety cover
51: Front cover portion
52: Upper cover portion
53: Fastening hole cover portion
54: Seating hole portion
54a: Placement surface
60: Connection holder part
61: Female connection groove portion 61a: Projection portion
62: Male connection protrusion
62a: Tip portion
62b: End piece Detailed Descriptions of Exemplary Embodiments Hereinafter, a power distribution device for a distribution board according to exemplary embodiments of the present invention will be described more specifically.

A power distribution device 1 for a distribution board of the present invention is a power distribution device capable of supplying power of a connection terminal 2a for a main circuit breaker 2 stacked at an upper side to a connection terminal 3a for a branch circuit breaker 3 and busbar connection terminals 41 for an additional circuit breaker 4 in a horizontal direction. A connection module 10 included in the power distribution device for a distribution board will be described in Embodiment 1, a height adjustment support 20 included in the power distribution device for a distribution board will be described in Embodiment 2, a rotary cover 30 included in the power distribution device for a distribution board will be described in Embodiment 3, a safety cover 50 included in the power distribution device for a distribution board will be described in Embodiment 3, and a housing alignment connection structure included in the power distribution device for a distribution board will be described in Embodiment 5.

Embodiment 1

Figure 2:
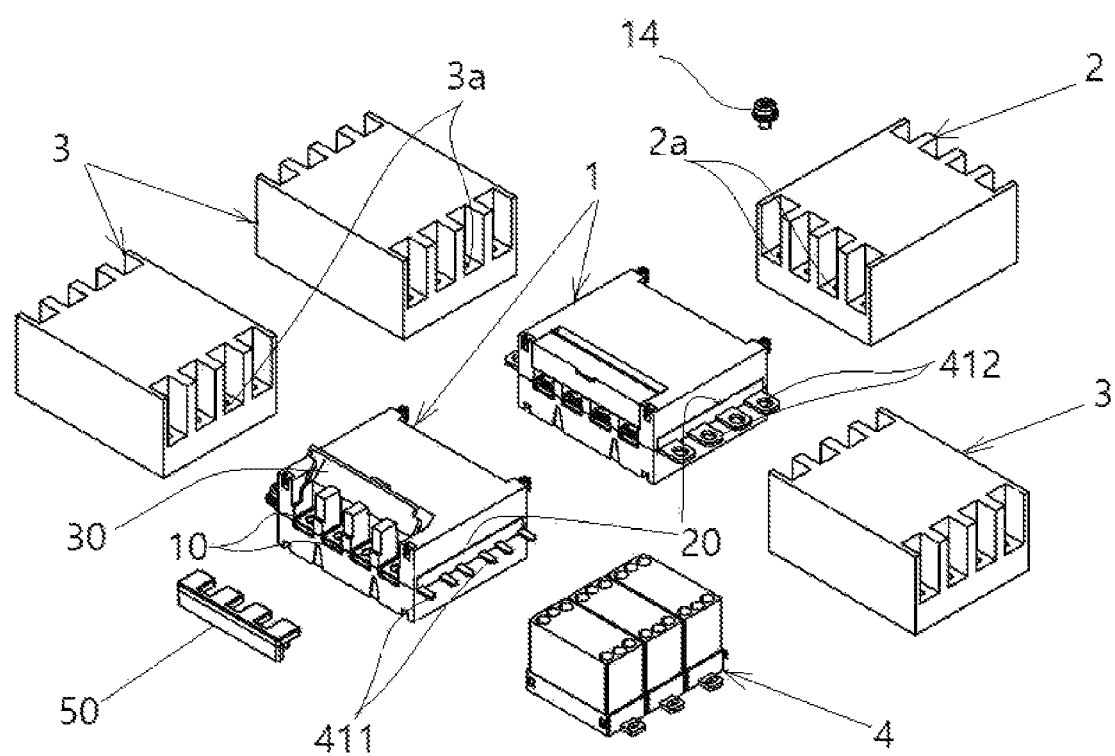
FIG. 2 is an exploded perspective view of the entire distribution board to which the power distribution device for a distribution board of the present invention is applied.
Figure 3:
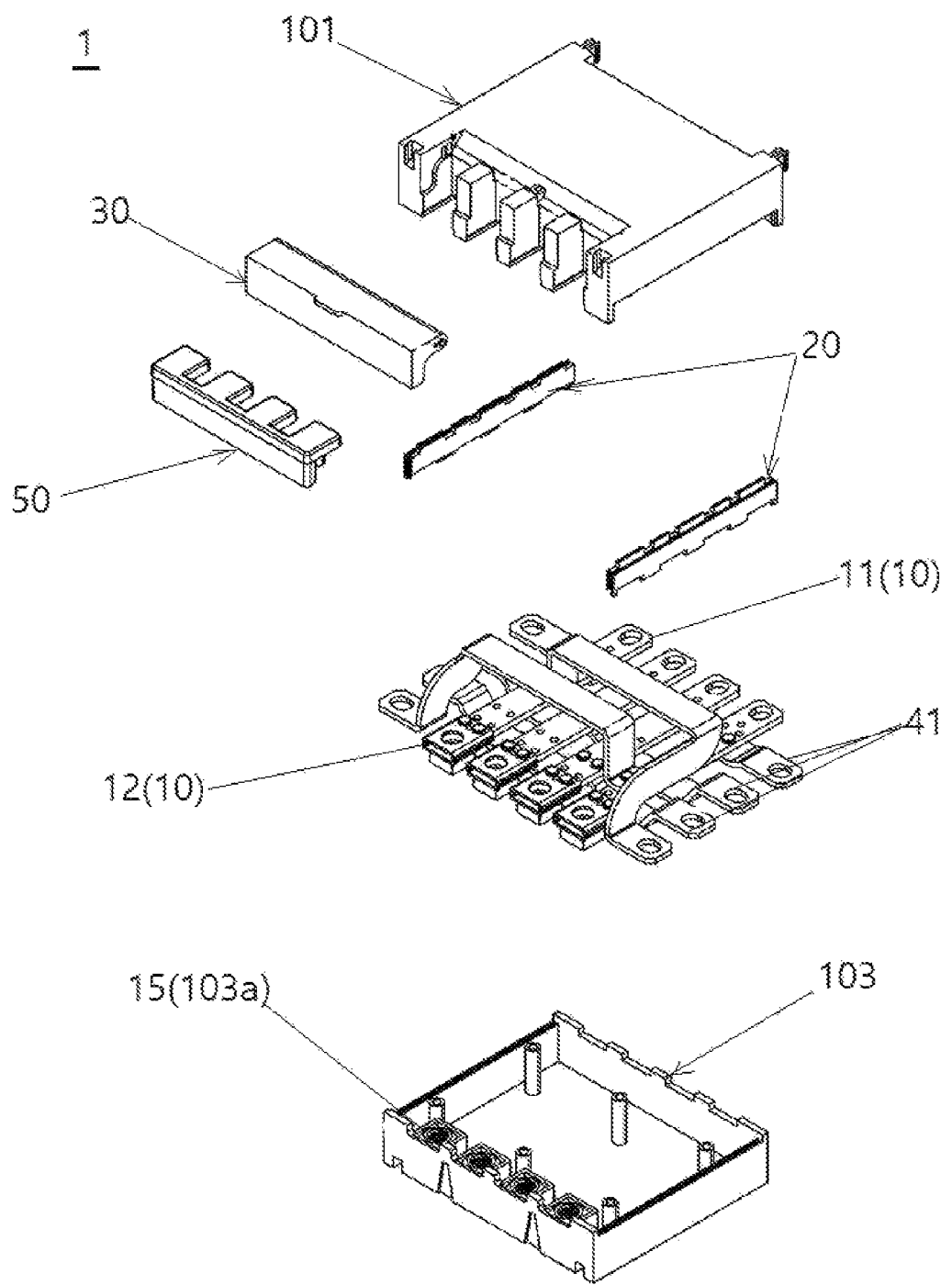
FIG. 3 is an exploded perspective view of the power distribution device for a distribution board of the present invention.
Figure 4:
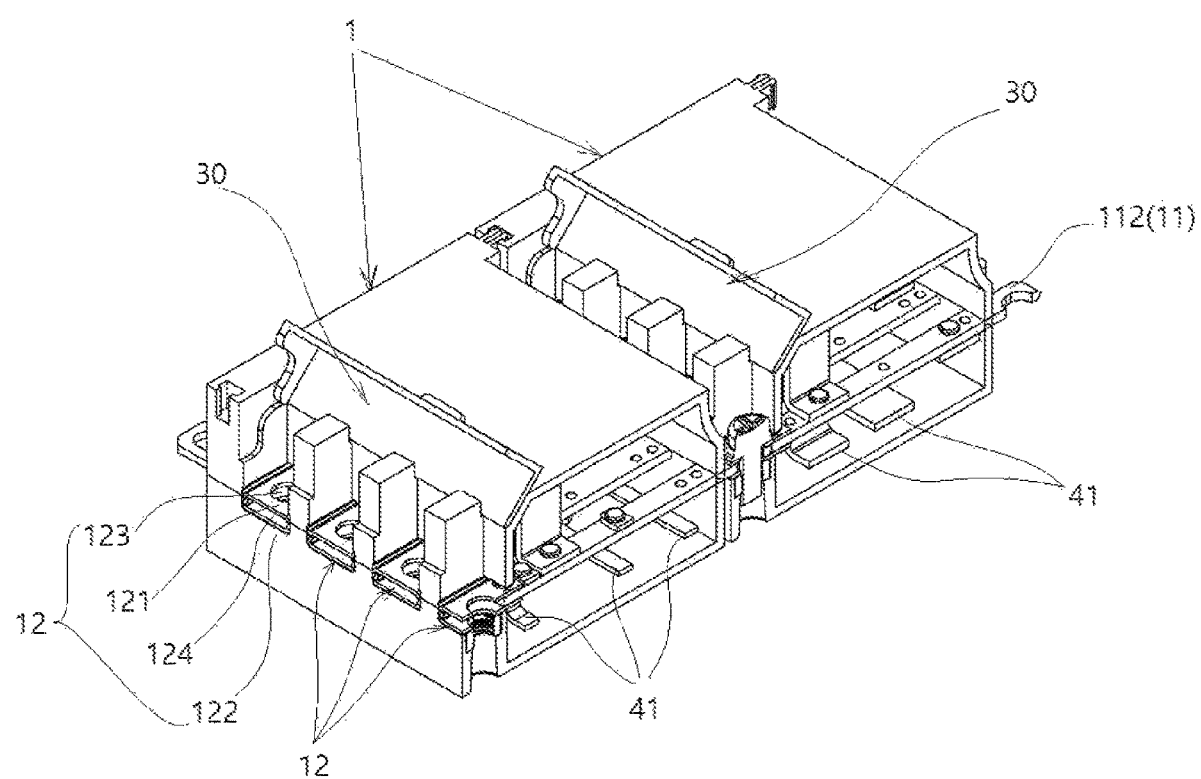
FIG. 4 is a perspective view illustrating a connected state of the power distribution device for a distribution board of the present invention.
Figure 5A:
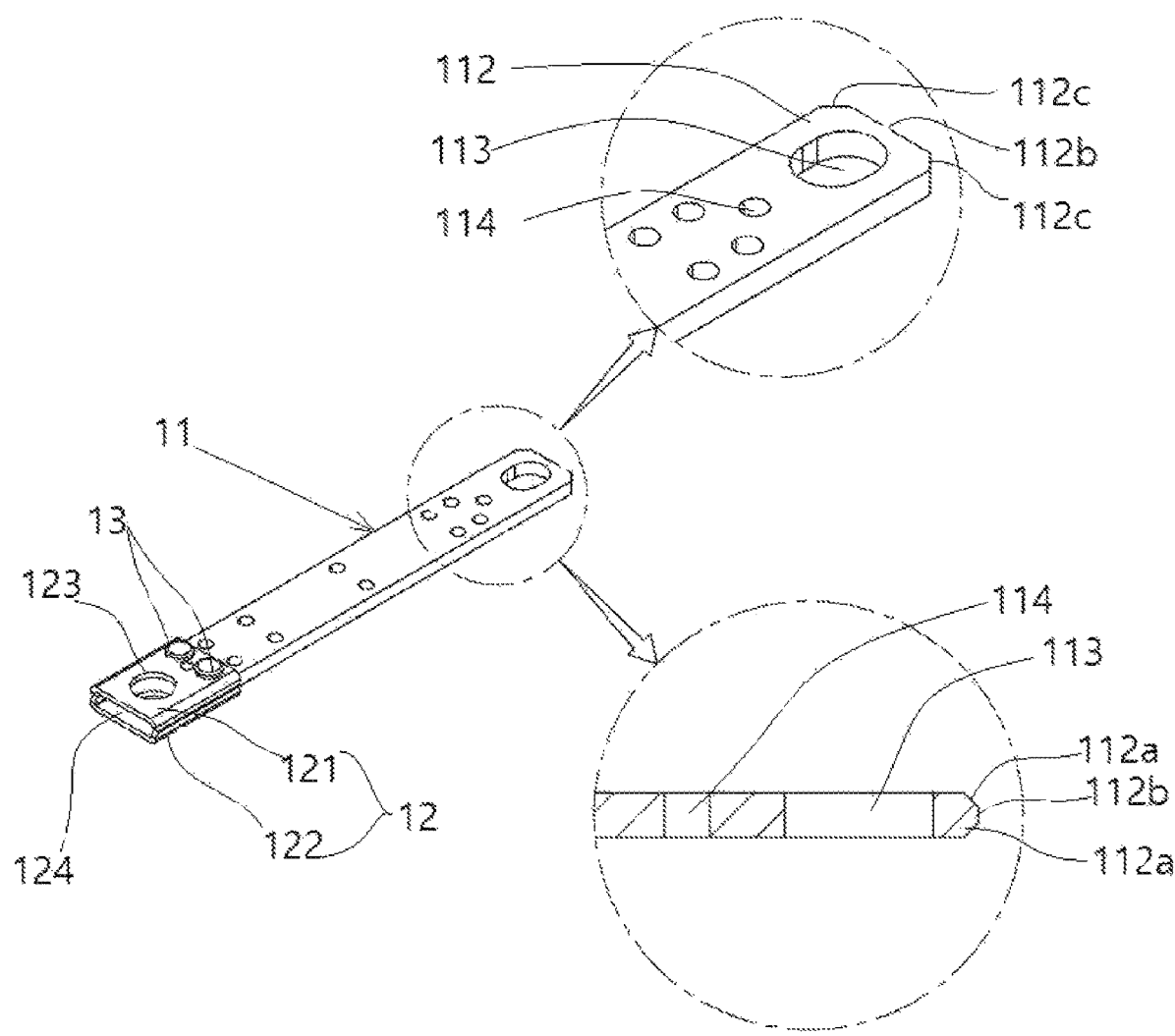
FIG. 5A is an extracted perspective view of a connection module of the power distribution device for a distribution board of the present invention.
Figure 5B:
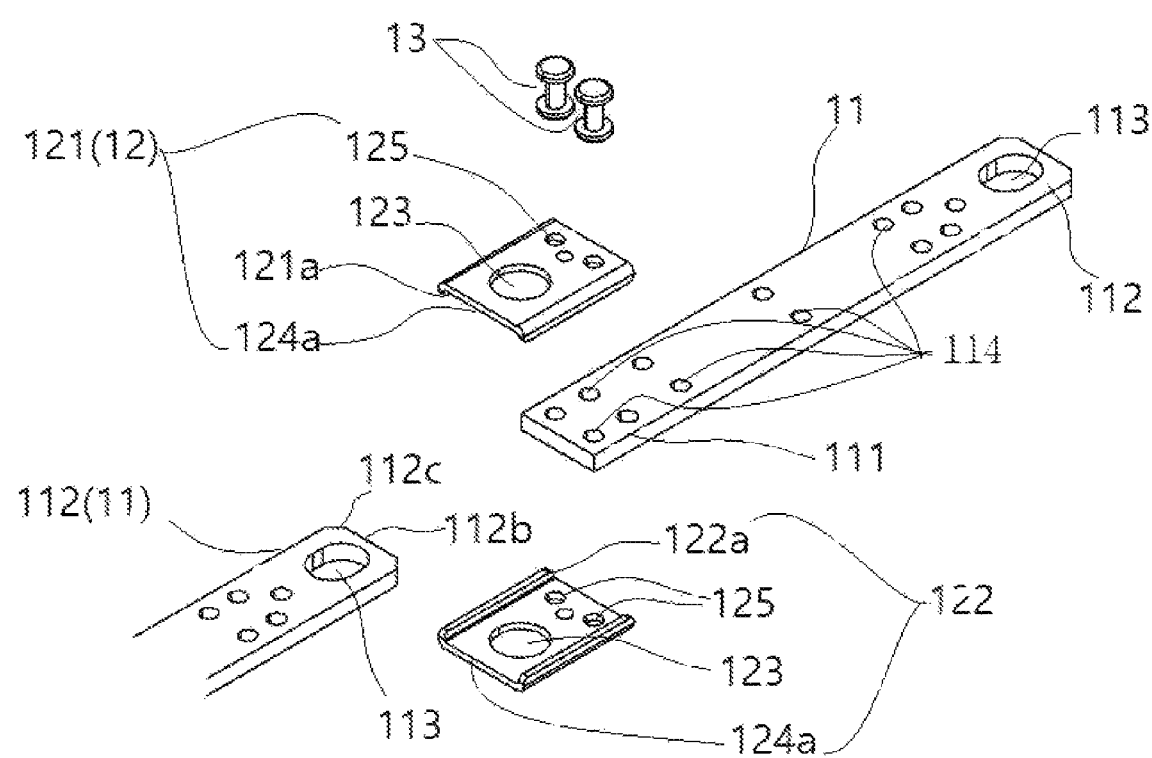
FIG. 5B is an exploded perspective view of the connection module of the power distribution device for a distribution board of the present invention.
Figure 6A:
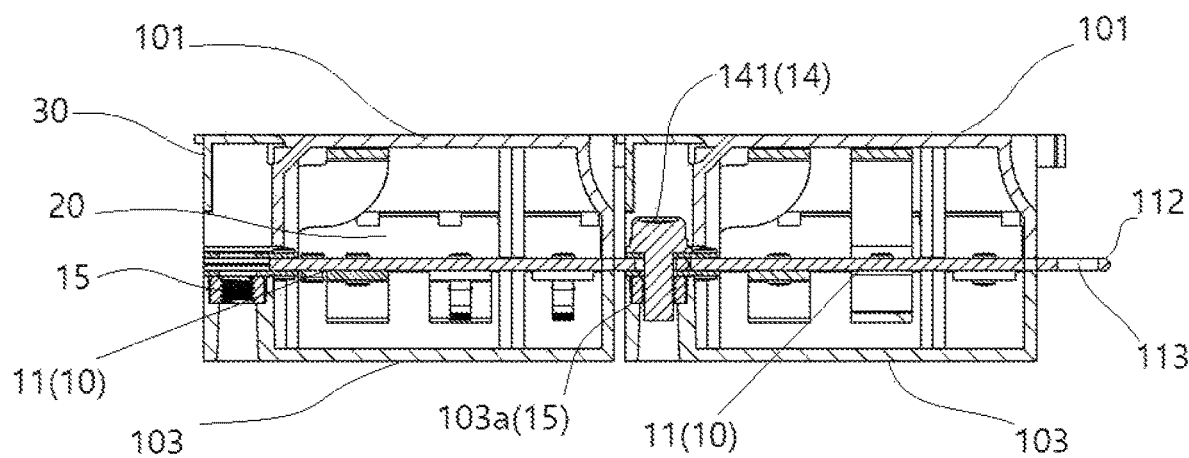
FIG. 6A is a cross-sectional view of an installed state including the connection module of the power distribution device for a distribution board of the present invention.
Figure 6B:
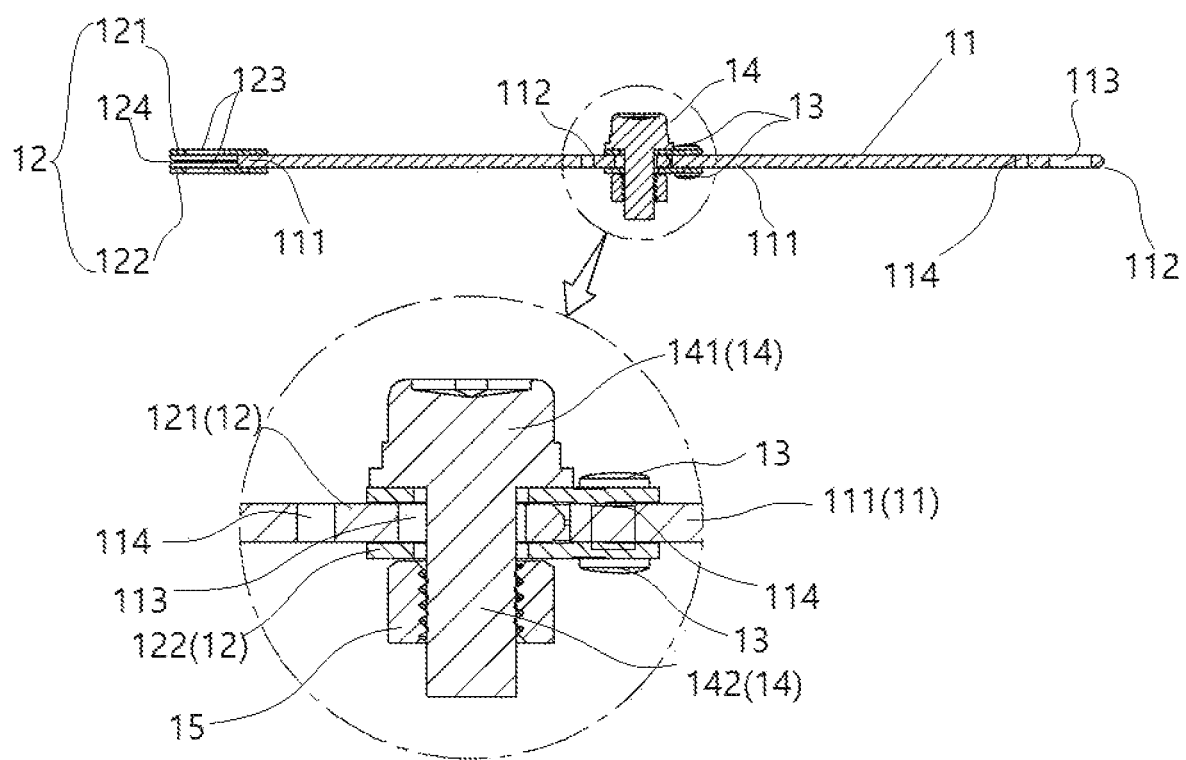
FIG. 6B is an extracted cross-sectional view of the connection module of the power distribution device for a distribution board of the present invention.

The attached FIG. 1 is a coupled perspective view of an entire distribution board to which a power distribution device for a distribution board of the present invention is applied, FIG. 2 is an exploded perspective view of the entire distribution board to which the power distribution device for a distribution board of the present invention is applied, FIG. 3 is an exploded perspective view of the power distribution device for a distribution board of the present invention, FIG. 4 is a perspective view illustrating a connected state of the power distribution device for a distribution board of the present invention, FIG. 5A is an extracted perspective view of a connection module of the power distribution device for a distribution board of the present invention, FIG. 5B is an exploded perspective view of the connection module of the power distribution device for a distribution board of the present invention, FIG. 6A is a cross-sectional view of an installed state including the connection module of the power distribution device for a distribution board of the present invention, and FIG. 6B is an extracted cross-sectional view of the connection module of the power distribution device for a distribution board of the present invention.

According to the entire distribution board coupled perspective view and the distribution board exploded perspective view to which the power distribution device for a distribution board in FIGS. 1 and 2 is applied among the drawings, the power distribution device 1 for a distribution board of the present invention may be the power distribution device 1 for a distribution board that distributes power of the main circuit breaker 1 to the terminal 2a for the main circuit breaker 2, the terminals 3a for the branch circuit breaker 3, and the busbar connection terminal 41 of the additional circuit breaker 4 between the main circuit breaker 2, the branch circuit breaker 3, and the additional circuit breaker 4, as illustrated in FIGS. 1 and 2.

The power distribution device 1 may include a housing 100 configured to cover an outer portion of the power distribution device, the connection module 10 disposed in a space in the housing 100 and connected to the busbar connection terminal 2a for the main circuit breaker 2 to receive power of the main circuit breaker 2, and the busbar connection terminal 41 stacked on and coupled to the connection module 10 connected to the busbar connection terminal 3a for the branch circuit breaker 3 and the busbar connection terminal 41 for the additional circuit breaker 4 to distribute the power of the main circuit breaker 2 to the busbar connection terminal 3a for the branch circuit breaker 3 and the busbar connection terminal 41 for the additional circuit breaker 4.

As illustrated in FIGS. 1 and 2 among the drawings, the power distribution device for a distribution board of the present invention constitutes the power distribution device (a kind of busbar assembly 1) connected to the connection terminals 3a for the main circuit breaker 1 and configured to supply power of the main circuit breaker 1 to the connection terminals 2a of the branch circuit breakers 2, and the power distribution device electrically connects the connection module 10 and the busbar connection terminal 41 to distribute and supply power to the additional circuit breakers 4.

The power distribution device 1 for a distribution board of the present invention, which is illustrated in FIGS. 3 and 4 among the attached drawings, may include the housing 100 including an upper housing 101 and a lower housing 103 installed on a floor.

In addition, the power distribution device may include the connection module 10 installed in the vertical direction in the lower housing 103 in the housing 100 and installed at the side of the busbar terminal 2a for the main circuit breaker 2, the height adjustment support 20 selectively installed to protect first and second output terminals 411 and 412 of the busbar connection terminal 41 stacked on and coupled to the connection module 10 and configured to distribute power of the main circuit breaker 2 to the branch circuit breaker 3 and the additional circuit breaker 4, and the rotary cover 30 disposed at a side of a vertically exposed output terminal (a first end of the connection module) of the upper housing 101, the rotary cover 30 being opened upward at the time of being connected to the output terminal and configured to cover and protect the lateral side after the connection.

The connection module 10 of the power distribution device 1 for a distribution board of the present invention illustrated in the attached FIGS. 5A, 5B, and 5C may broadly include a connection terminal 11, a connection member 12, coupling members 13, an electrically conducting fastening member 14, and a ring-shaped nut member 15.

As illustrated in FIG. 5B, the connection terminal 11 has a first end 111 formed at any one of the two opposite ends, and a second end 112 formed at the other of the two opposite ends. A plate-shaped surface having a predetermined width may extend in a length direction between the first end 111 and the second end 112 of the connection terminal 11, and a plurality of coupling rivet holes 114 may be formed in the plate-shaped surface between the first end 111 and the second end 112.

In particular, a contact connection hole 113 may be formed at a side of the second end 112. As illustrated in FIG. 5A, inclined surfaces 112a may be formed on upper and lower surfaces, and a tip surface 112b may be formed at an end between the inclined surfaces 112a. The second end 112 may have a smooth insertion structure having curved portions 112c that are easily inserted into a connection hole 124 to be described below.

The connection member 12 includes a first connection member 121 coupled while covering the second end 112 of the connection terminal 11 from above to define the connection hole 124 to which the second end 112 of the connection terminal 11 is electrically connected, and a second connection member 122 coupled to support the connection terminal 11 from below to define the connection hole 124 to which the connection terminal 11 is electrically connected.

The first and second connection members 121 and 122 respectively have two opposite edges 121a and 122a, fastening holes 123, and coupling holes 125 that respectively correspond to one another and are coupled to one another. Front and rear ends of each of the first and second connection members 121 and 122 may be defined as open ends 124a and 124b. The open ends 124a and 124b may define the connection hole 124 as the first and second connection members 121 and 122 are coupled in the upward/downward direction with the first end 111 of the connection terminal 11 interposed therebetween as the coupling members 13 are coupled while penetrating the coupling holes 125.

A depth of the connection hole 124 may define 50% of an insertion/attachment length of the first end 111 and the second end 112 so that the second end 112 of the connection terminal 11 is inserted and attached.

The electrically conducting fastening member 14 penetrates the fastening holes 123 of the connection member 12 and the fastening hole 113 of the first end 111 of the connection terminal 11 and is fixedly installed by the ring-shaped nut member 15 embedded and installed in a bottom housing 103.

The electrically conducting fastening member 14 includes a stem portion 142 configured to penetrate the fastening holes 123 of the first and second connection members 121 and 122, and a head portion 141 supported by being caught by the fastening holes 123.

The ring-shaped nut member 15 has a screw hole 151 to which the stem portion 142 of the fastening member 14 is screw-coupled, and an outer edge of the ring-shaped nut member 15 is defined as a quadrangular edge.

The ring-shaped nut member 15 is embedded and fixed so that an upper portion thereof is exposed through a fastening groove portion 103a formed at a predetermined position along an outer peripheral edge of the lower housing 103.

The electrically conducting fastening member 14 is fastened and coupled to the ring-shaped nut member 15 fixed to the fastening groove portion 103a as the stem portion 142 of the electrically conducting fastening member 14 is screw-coupled to the screw hole 151 of the ring-shaped nut member 15 in the fastening groove portion 103a while sequentially passing through the fastening hole 123 of the first connection member 121, the fastening hole 113 of the connection terminal 11, and the fastening hole 123 of the second connection member 122.

As illustrated in the attached FIG. 6A, in the power distribution device 1 for a distribution board of the present invention, the connection terminal 11, which constitutes the connection module 10, is installed at a horizontal center portion between the upper housing 101 and the lower housing 103.

The two connection terminals 11 illustrated in FIG. 6B are connected in the horizontal direction and maintain an electrically conducting state.

The connection module 10 extracted from FIG. 6A is in the state in which the two connection terminals 11 are connected. The second end 112 of the connection terminal 11 at the right side based on the drawings is exposed toward the output terminal 3a of the branch circuit breaker 3 at the left side, the connection member 12 coupled to the second terminal 111 at the left side is positioned, and the second end 112 of another connection terminal 11 is inserted into the connection hole 124. The electrically conducting fastening member 14 penetrates the fastening holes 123 and the fastening hole 113 and is screw-coupled to the ring-shaped nut member 15 fixedly embedded in the lower housing 103. Further, the connection terminal 11 has a plurality of coupling rivet holes 114 that has not been described. The connection terminal 11 is coupled to connection terminals (no reference numerals) of the power distribution devices of one or more branch circuit breakers disposed in the vertical direction through the horizontal and vertical rivet coupling holes 114.

Therefore, the connection module 10 is formed at a thickness center without being biased toward any one of one surface or the other surface, such that the power distribution device for a distribution board may be installed in a state in which one surface and the other surface are inverted at 180 degrees regardless of the position.

This configuration may serve to divide and supply power in an intersection direction so that the power, which is supplied from the main branch circuit breaker 2 through the power distribution device 1 for a distribution board of the present invention, is supplied to the branch circuit breaker 3 and the additional circuit breaker 4.

The configuration for connecting the two connection terminals 11 of the connection module 10 in the horizontal state may maintain the horizontality, thereby providing a simple and concise assembling structure in terms of overall assembling and installing processes in comparison with the burring forming structure of the connection terminals of the busbar assembly (power distribution device) known in the related art and the structure having the stepped portion formed toward the output side.

The stable fixed state of the horizontal connection structure of the power distribution device 1 for a distribution board of the present invention may provide the coupling effect in order to stably distribute and provide power even in various outside flow situations.

As illustrated in the exploded view of FIG. 4, the connection modules 10 and the branching-connection terminals 40 ensure spaces through which the connection modules 10 and the branching-connection terminals 40 may be extended to the upper side of the connection modules 10 of the present invention. However, in the connection terminals in the related art, the electrically conducting structures are formed in common so that the first end of the connection terminal is connected to the stepped portion of the second end. Alternatively, the terminal of any one of the first and second ends has the stepped portion, and the burring is formed downward, such that the horizontally connected state is maintained stably. The forming of the stepped portion or the forming of the burring for horizontally coupling the terminals eventually prevents instability of electric conduction during the connection but causes a problem in that spaces of the upper and lower connection rotary covers may be expanded.

In addition to the above-mentioned improvement, as illustrated in FIG. 6B, the connection terminal 11 of the connection module 10 of the power distribution device 1 for a distribution board of the present invention may be maintained in a linear shape, thereby reducing a width of an induced current that may be induced in the terminal connected state of the complicated intersection coupling structure such as three-phase ground wires. When the thickness of the connection portion of the connection terminal in the related art increases, the expansion width of the induced current in the electrically conducting state increases, which may prevent an erroneous operation caused by a disturbing current to other terminals.

The simple connecting and fastening of the connection hole 124 formed in the connection member 12 at the side of the first end 111 of the connection terminal 11 of the connection module 10 implements the terminal connection structure in the related art in which the connection terminals are placed and fastened on the upper and lower surfaces, such that the operation of binding the connection module 10 may be performed more conveniently and easily. Further, the screw-coupling of the stem portion 142 of the fastening member 14 may increase a contact force, thereby improving both the fixing force and the electrically conducting state.

According to the power distribution device 1 for a distribution board according to the present invention configured as described above, the connection terminals 11 of the busbar connection module 10 are kept in a horizontally linear state, the connection terminals 11 may be conveniently disposed in the upper and lower rotary covers of the distribution board regardless of the position with respect to the upper and lower surfaces. Further, the connection terminal 11 may be screw-coupled to the ring-shaped nut member 15, which defines the quadrangular outer edge of the lower housing 103, thereby maintaining the stable coupling force.

In addition, the second end 112 of the connection terminal 11 may be simply, quickly, and easily fastened to the connection hole 124 by screw-coupling, assembling, and releasing the fastening member 14, such that the operation of maintaining and replacing the connection module 10 may be efficiently performed.

In addition, the fastening member 14 is screw-coupled to the ring-shaped nut member 15 of the lower housing 103 while penetrating the fastening holes 123 of the first and second connection members 121 and 122 and the connection hole 113 of the second end 112, such that the coupling force is increased. Therefore, it is possible to reduce electrical resistance and prevent the terminal of the main circuit breaker 2, the output terminals 31 and 32 of the branch circuit breaker 3, and the terminals of the additional circuit breaker 4 from being easily separated when external impact is applied.

Meanwhile, in case that a material, such as copper clad aluminum, which is a new material and has low heat resistance, is used as a material of the terminal, it is possible to solve a problem in which the connection part is released by deformation of the material by heat generated by the connection of the output terminal 2a of the main circuit breaker 2 and the output terminal 41 of the additional circuit breaker 4.

The output terminal of the power distribution device 1 for a distribution board of the present invention and the terminal of the additional circuit breaker 4 are securely coupled to prevent bolt releasing of the connection portion.

The ring-shaped nut member 15 is fixed to the lower housing 103 by injection molding for fixing the nut member, and the nut is automatically coupled when the stem portion 142 of the fastening member 14 is fastened, such that the injection molding may solve the process problem in which a nut needs to be separately held or fixed from below, thereby improving the working efficiency.

Embodiment 2

The present embodiment is based on the entire power distribution device for a distribution board of Embodiment 1, and a repeated description of some components will be omitted. The components required for the present embodiment will be described again with reference to the drawings of Embodiment 1.

That is, the power distribution device 1 for a distribution board of the present invention includes the main circuit breaker 2 configured to receive power of the main circuit breaker, the branch circuit breakers 3 configured to distribute the power of the main circuit breaker 2 in another direction, the additional output terminal circuit breaker 3, and the power distribution device 1 for a distribution board that is connected to the branch circuit breaker 3 and the additional output terminal circuit breaker 4 and distributes the power of the main circuit breaker 1 to the branch circuit breaker 3 and the additional output terminal circuit breaker 4.

The power distribution device 1 for a distribution board of the present invention may include the upper housing 101, the lower housing 103 installed on the floor, the connection module 10 installed in the vertical direction at the side of the main circuit breaker 2 in the lower housing 103, and the rotary cover 30 configured to be opened upward at the time of being connected to the output terminal at the side of the vertically exposed output terminal of the upper housing 101 (the first end of the connection module) and configured to cover and protect the lateral side after the connection.

The connection module 10 of the power distribution device 1 for a distribution board of the present invention broadly includes the connection terminal 11, the connection member 12, the coupling members 13, the electrically conducting fastening member 14, and the ring-shaped nut member 15.

The connection terminal 11 has the first end 111 formed at any one of the two opposite ends, and the second end 112 formed at the other of the two opposite ends. The plate-shaped surface having a predetermined width may extend in the length direction between the first end 111 and the second end 112 of the connection terminal 11, and the plurality of coupling rivet holes 114 may be formed in the plate-shaped surface between the first end 111 and the second end 112.

The contact connection hole 113 may be formed at the side of the second end 112. The inclined surfaces 112a may be formed on the upper and lower surfaces, and the tip surface 112b may be formed at the end between the inclined surfaces 112a. The second end 112 may have the smooth insertion structure having the curved portions 112c that are easily inserted into the connection hole 124.

The connection member 12 includes the first connection member 121 coupled while covering the second end 112 of the connection terminal 11 from above to define the connection hole 124 to which the second end 112 of the connection terminal 11 is electrically connected, and the second connection member 122 coupled to support the connection terminal 11 from below to define the connection hole 124 to which the connection terminal 11 is electrically connected.

The first and second connection members 121 and 122 respectively have the two opposite edges 121a and 122a, the fastening holes 123, and the coupling holes 125 that respectively correspond to one another and are coupled to one another. The front and rear ends of each of the first and second connection members 121 and 122 may be defined as the open ends 124a and 124b. The open ends 124a and 124b may define the connection hole 124 as the first and second connection members 121 and 122 are coupled in the upward/downward direction with the first end 111 of the connection terminal 11 interposed therebetween as the coupling members 13 are coupled while penetrating the coupling holes 125.

The depth of the connection hole 124 may define 50% of the insertion/attachment length of the first end 111 and the second end 112 so that the second end 112 of the connection terminal 11 is inserted and attached.

The electrically conducting fastening member 14 penetrates the fastening holes 123 of the connection member 12 and the fastening hole 113 of the first end 111 of the connection terminal 11 and is fixedly installed by the ring-shaped nut member 15 embedded and installed in a bottom housing 103.

The electrically conducting fastening member 14 includes the stem portion 142 configured to penetrate the fastening holes 123 of the first and second connection members 121 and 122, and the head portion 141 supported by being caught by the fastening holes 123.

The ring-shaped nut member 15 has the screw hole 151 to which the stem portion 142 of the fastening member 14 is screw-coupled, and the outer edge of the ring-shaped nut member 15 is defined as a quadrangular edge.

The ring-shaped nut member 15 is embedded and fixed so that the upper portion thereof is exposed through the fastening groove portion 103a formed at a predetermined position along the outer peripheral edge of the lower housing 103.

The electrically conducting fastening member 14 is fastened and coupled to the ring-shaped nut member 15 fixed to the fastening groove portion 103a as the stem portion 142 of the electrically conducting fastening member 14 is screw-coupled to the screw hole 151 of the ring-shaped nut member 15 in the fastening groove portion 103a while sequentially passing through the fastening hole 123 of the first connection member 121, the fastening hole 113 of the connection terminal 11, and the fastening hole 123 of the second connection member 122.

Hereinafter, the height adjustment support 20 will be specifically described with reference to the drawings.

Figure 7:
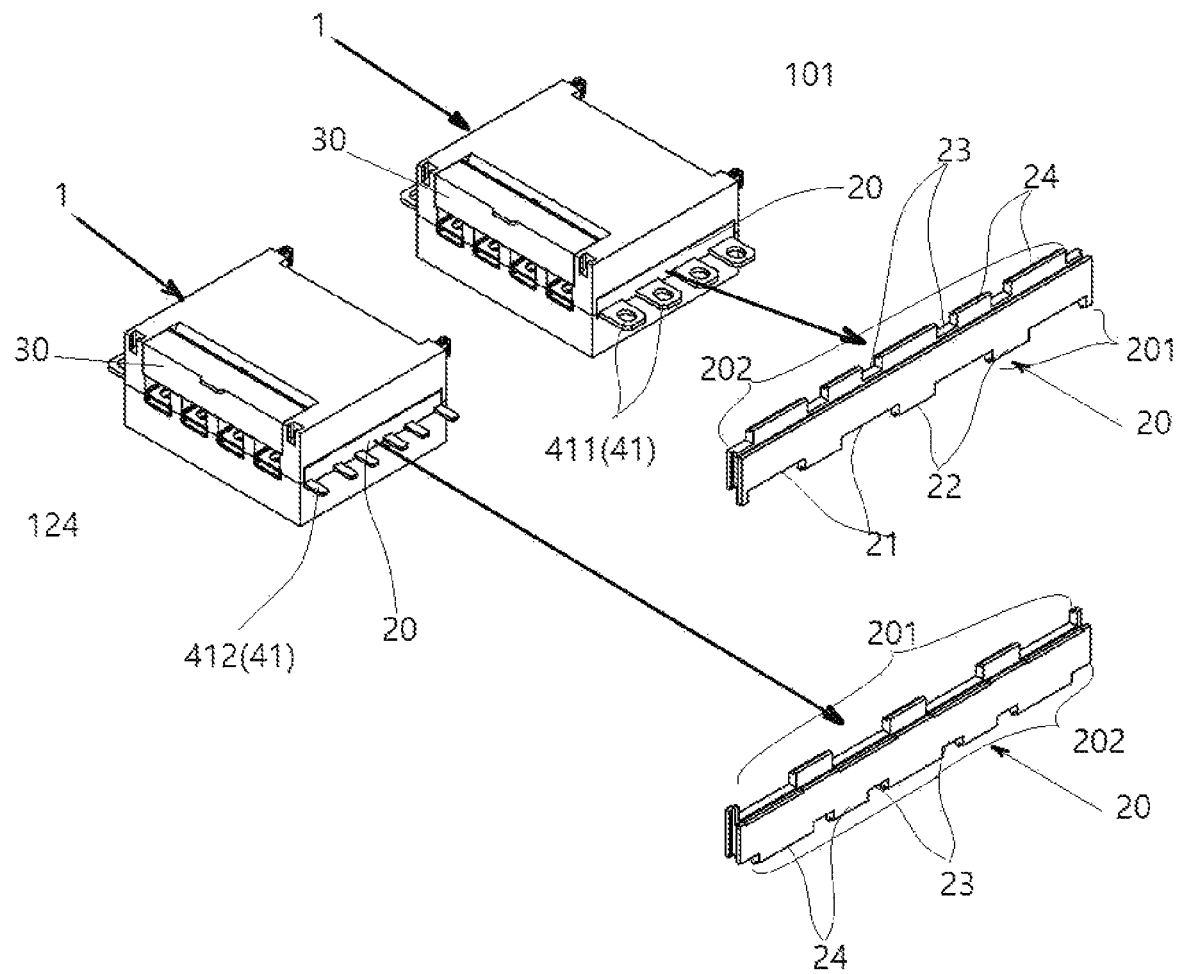
FIG. 7 is a perspective view illustrating an application state according to an embodiment of a height adjustment support of the power distribution device for a distribution board of the present invention.
Figure 8A:
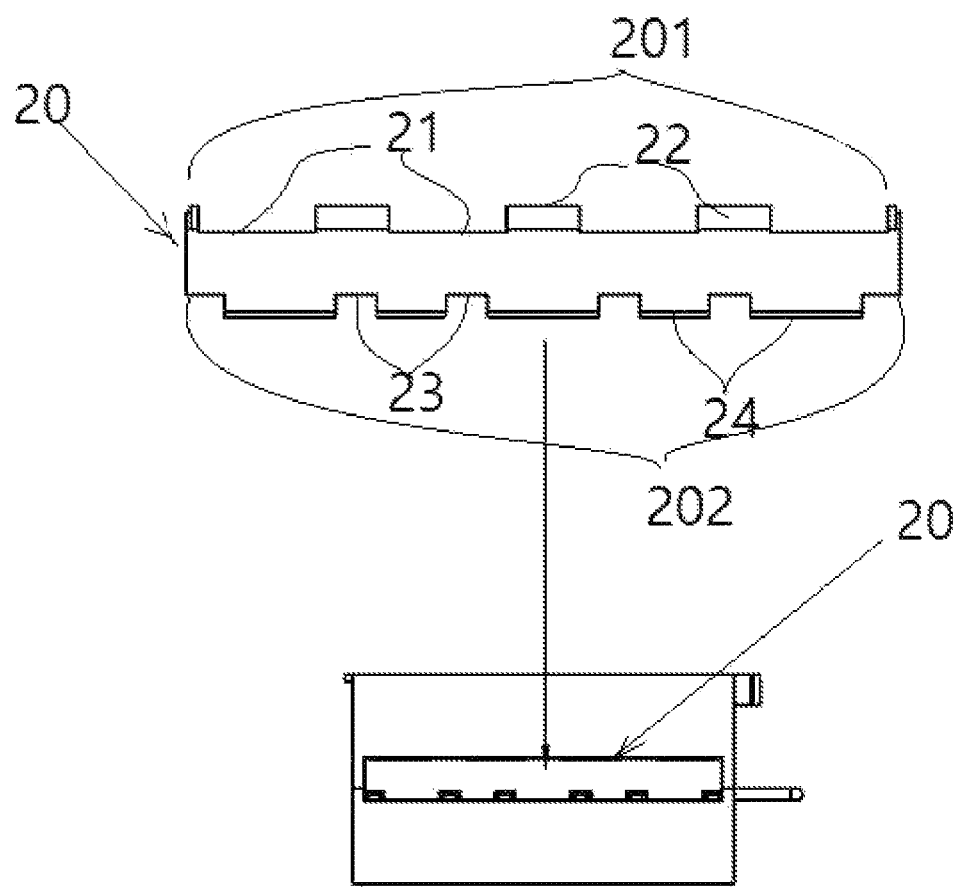
FIG. 8A is a side view of a first application state according to the embodiment of the height adjustment support of the power distribution device for a distribution board of the present invention.
Figure 8B:
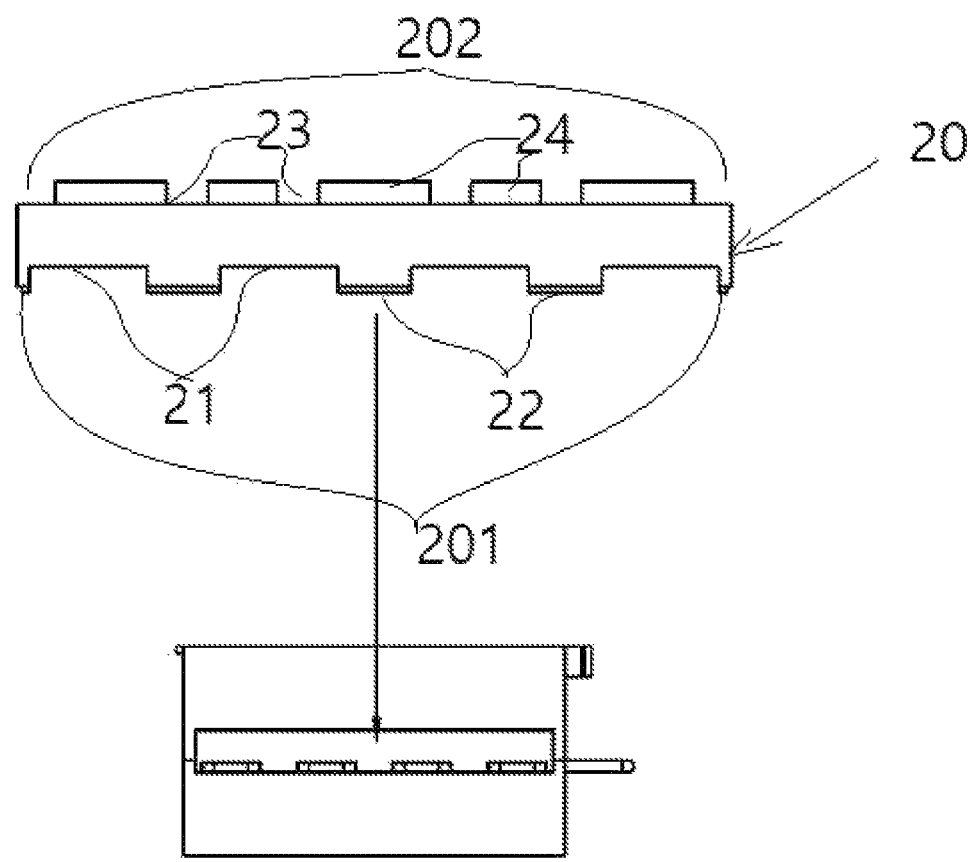
FIG. 8B is a side view of a second application state of the embodiment of the height adjustment support of the power distribution device for a distribution board of the present invention when viewed in another direction.

FIG. 7 is a perspective view illustrating an application state according to an embodiment of the height adjustment support of the power distribution device for a distribution board of the present invention, FIG. 8A is a side view of a first application state according to the embodiment of the height adjustment support of the power distribution device for a distribution board of the present invention, and FIG. 8B is a side view of a second application state of the embodiment of the height adjustment support of the power distribution device for a distribution board of the present invention when viewed in another direction.

With reference to the drawings, the height adjustment support 20 of the power distribution device 1 for a distribution board of the present invention is a cover structure that may be interchangeably used to be matched with heights of the two output terminals having different heights by changing upper and lower positions so that the upper and lower positions are matched with heights of the first terminal 411 and the second terminal 32 of the branch circuit breaker 3. This structure improves the two height adjustment supports separately formed to be matched with the output terminals in the related art.

That is, the height adjustment support 20 of the power distribution device for a distribution board of the present invention may have four first coupling grooves 21 and four first coupling protruding portions 22 alternately formed along a first surface 201 so as to be matched with the height of the first output terminal 411 of the branch circuit breaker 3. The number of first coupling grooves 21 and the number of first coupling protruding portions 22 may each be changed to four or more depending on the devices to be used.

In addition, the height adjustment support 20 of the power distribution device for a distribution board of the present invention may have four second coupling grooves 23 and four second coupling protruding portions 24 alternately along a second surface 202 so as to be matched with the height of the second output terminal 412 of the branch circuit breaker 3. Of course, the number of second coupling grooves 23 and the number of second coupling protruding portions 24 may each be changed to five to six or more.

As illustrated in FIGS. 7, 8A, and 8B, in the height adjustment support 20 the power distribution device for a distribution board of the present invention configured as described above, the second coupling grooves 23 and the second coupling protruding portions 24 of the second surface portion 202 of the height adjustment support 20 may be mounted to be matched with the height of the first output terminal 411 so as to be matched with the output terminals 411 and 412 of the branch circuit breaker 3, and the upper and lower positions of the height adjustment support 20 may be inverted so that the first coupling grooves 21 and the first coupling protruding portions 22 of the first surface portion 201 are positioned at the height of the second output terminal 412. The height adjustment support 20 of the power distribution device 1 for a distribution board of the present invention is the single rectangular body, the first coupling grooves 21 and the first coupling protruding portions 22 are formed on the first surface portion 201 that defines one horizontal surface (upper surface), and the second coupling grooves 23 and the second coupling protruding portions 24 are formed on the second surface portion 202 positioned on the other horizontal surface (lower surface), such that the height adjustment support has the improvement implemented by the single body while being identical in function to the two height adjustment supports that are manufactured and mounted to be matched with the terminal grooves of the first and second output terminals 31 and 32 in the related art.

Embodiment 3

The present embodiment is based on the entire power distribution device for a distribution board of Embodiment 1, and a repeated description of some components will be omitted. The components required for the present embodiment 3 will be described again with reference to Embodiment 1.

The power distribution device 1 for a distribution board of the present invention includes the main circuit breaker 2 configured to receive power of the main circuit breaker, the branch circuit breakers 3 configured to distribute the power of the main circuit breaker 2 in another direction, the additional output terminal circuit breaker 3, and the power distribution device 1 for a distribution board that is connected to the branch circuit breaker 3 and the additional output terminal circuit breaker 4 and distributes the power of the main circuit breaker 1 to the branch circuit breaker 3 and the additional output terminal circuit breaker 4.

The power distribution device 1 for a distribution board of the present invention may include the upper housing 101, the lower housing 103 installed on the floor, the connection module 10 installed in the vertical direction at the side of the main circuit breaker 2 in the lower housing 103, and the rotary cover 30 configured to be opened upward at the time of being connected to the output terminal at the side of the vertically exposed output terminal of the upper housing 101 (the first end of the connection module) and configured to cover and protect the lateral side after the connection.

The connection module 10 of the power distribution device 1 for a distribution board of the present invention broadly includes the connection terminal 11, the connection member 12, the coupling members 13, the electrically conducting fastening member 14, and the ring-shaped nut member 15.

The connection terminal 11 has the first end 111 formed at any one of the two opposite ends, and the second end 112 formed at the other of the two opposite ends. The plate-shaped surface having a predetermined width may extend in the length direction between the first end 111 and the second end 112 of the connection terminal 11, and the plurality of coupling rivet holes 114 may be formed in the plate-shaped surface between the first end 111 and the second end 112.

The contact connection hole 113 may be formed at the side of the second end 112. The inclined surfaces 112a may be formed on the upper and lower surfaces, and the tip surface 112b may be formed at the end between the inclined surfaces 112a. The second end 112 may have the smooth insertion structure having the curved portions 112c that are easily inserted into the connection hole 124.

The connection member 12 includes the first connection member 121 coupled while covering the second end 112 of the connection terminal 11 from above to define the connection hole 124 to which the second end 112 of the connection terminal 11 is electrically connected, and the second connection member 122 coupled to support the connection terminal 11 from below to define the connection hole 124 to which the connection terminal 11 is electrically connected.

The first and second connection members 121 and 122 respectively have the two opposite edges 121a and 122a, the fastening holes 123, and the coupling holes 125 that respectively correspond to one another and are coupled to one another. The front and rear ends of each of the first and second connection members 121 and 122 may be defined as the open ends 124a and 124b. The open ends 124a and 124b may define the connection hole 124 as the first and second connection members 121 and 122 are coupled in the upward/downward direction with the first end 111 of the connection terminal 11 interposed therebetween as the coupling members 13 are coupled while penetrating the coupling holes 125.

The depth of the connection hole 124 may define 50% of the insertion/attachment length of the first end 111 and the second end 112 so that the second end 112 of the connection terminal 11 is inserted and attached.

The electrically conducting fastening member 14 penetrates the fastening holes 123 of the connection member 12 and the fastening hole 113 of the first end 111 of the connection terminal 11 and is fixedly installed by the ring-shaped nut member 15 embedded and installed in a bottom housing 103.

The electrically conducting fastening member 14 includes the stem portion 142 configured to penetrate the fastening holes 123 of the first and second connection members 121 and 122, and the head portion 141 supported by being caught by the fastening holes 123.

The ring-shaped nut member 15 has the screw hole 151 to which the stem portion 142 of the fastening member 14 is screw-coupled, and the outer edge of the ring-shaped nut member 15 is defined as a quadrangular edge.

The ring-shaped nut member 15 is embedded and fixed so that the upper portion thereof is exposed through the fastening groove portion 103a formed at a predetermined position along the outer peripheral edge of the lower housing 103.

The electrically conducting fastening member 14 is fastened and coupled to the ring-shaped nut member 15 fixed to the fastening groove portion 103a as the stem portion 142 of the electrically conducting fastening member 14 is screw-coupled to the screw hole 151 of the ring-shaped nut member 15 in the fastening groove portion 103a while sequentially passing through the fastening hole 123 of the first connection member 121, the fastening hole 113 of the connection terminal 11, and the fastening hole 123 of the second connection member 122.

Hereinafter, a rotation structure of the rotary cover 30 will be specifically described with reference to the drawings.

Figure 9A:
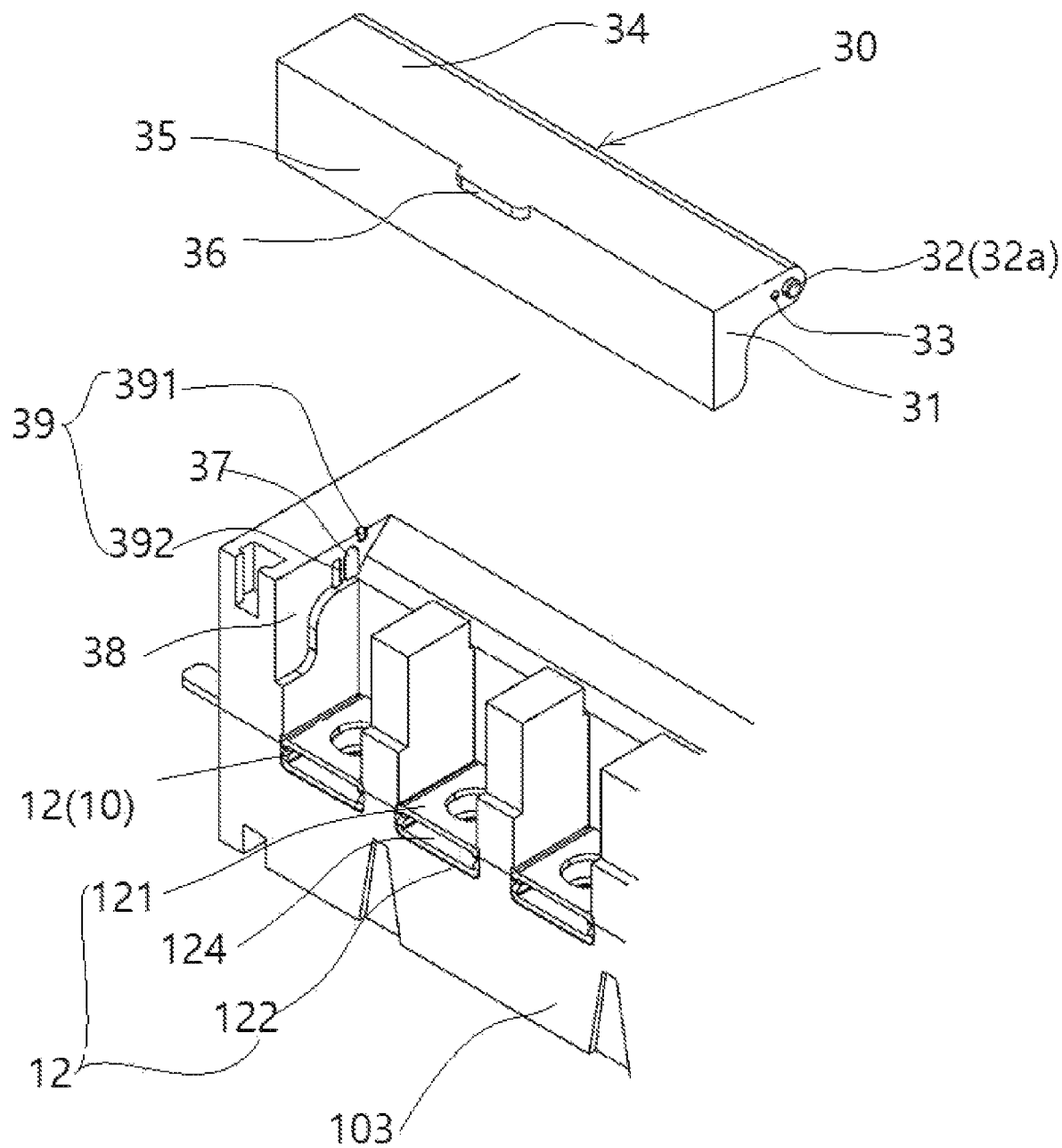
FIG. 9A is an exploded perspective view of a rotary cover according to an embodiment of the rotary cover of the power distribution device for a distribution board of the present invention.
Figure 9B:
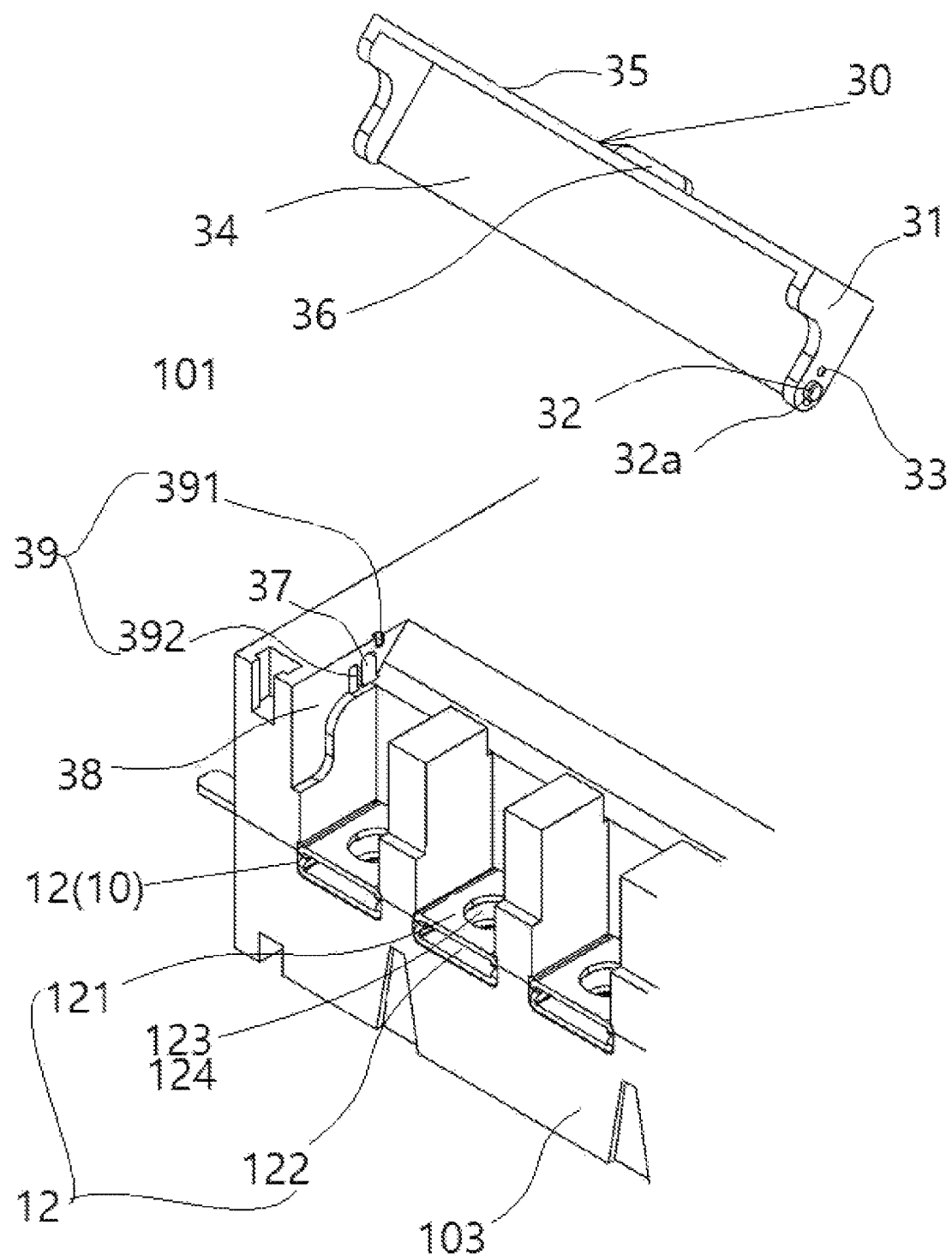
FIG. 9B is an exploded perspective view of the rotary cover according to the embodiment of the rotary cover of the power distribution device for a distribution board of the present invention when viewed in another direction.
Figure 10A:
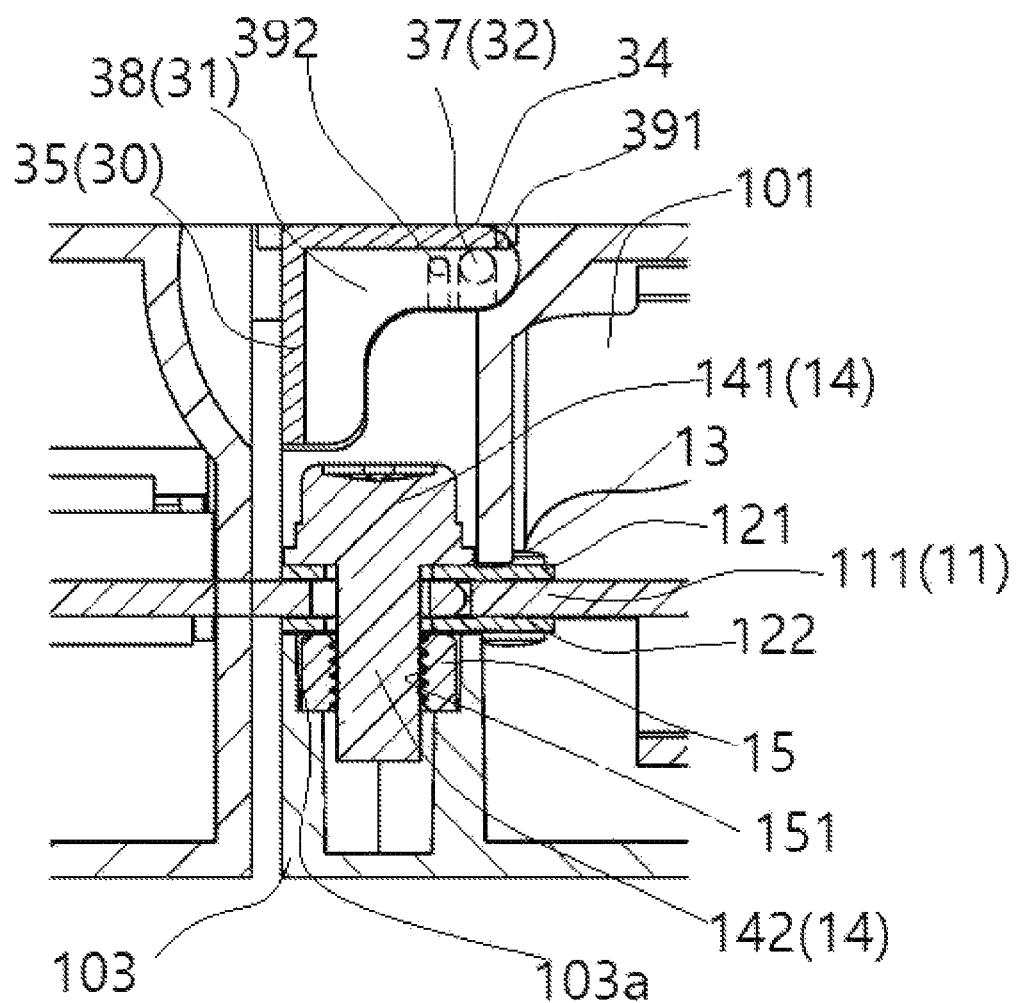
FIG. 10A is a cross-sectional side view illustrating a closed state and an opened state of the rotary cover according to the embodiment of the rotary cover of the power distribution device for a distribution board of the present invention.
Figure 10B:
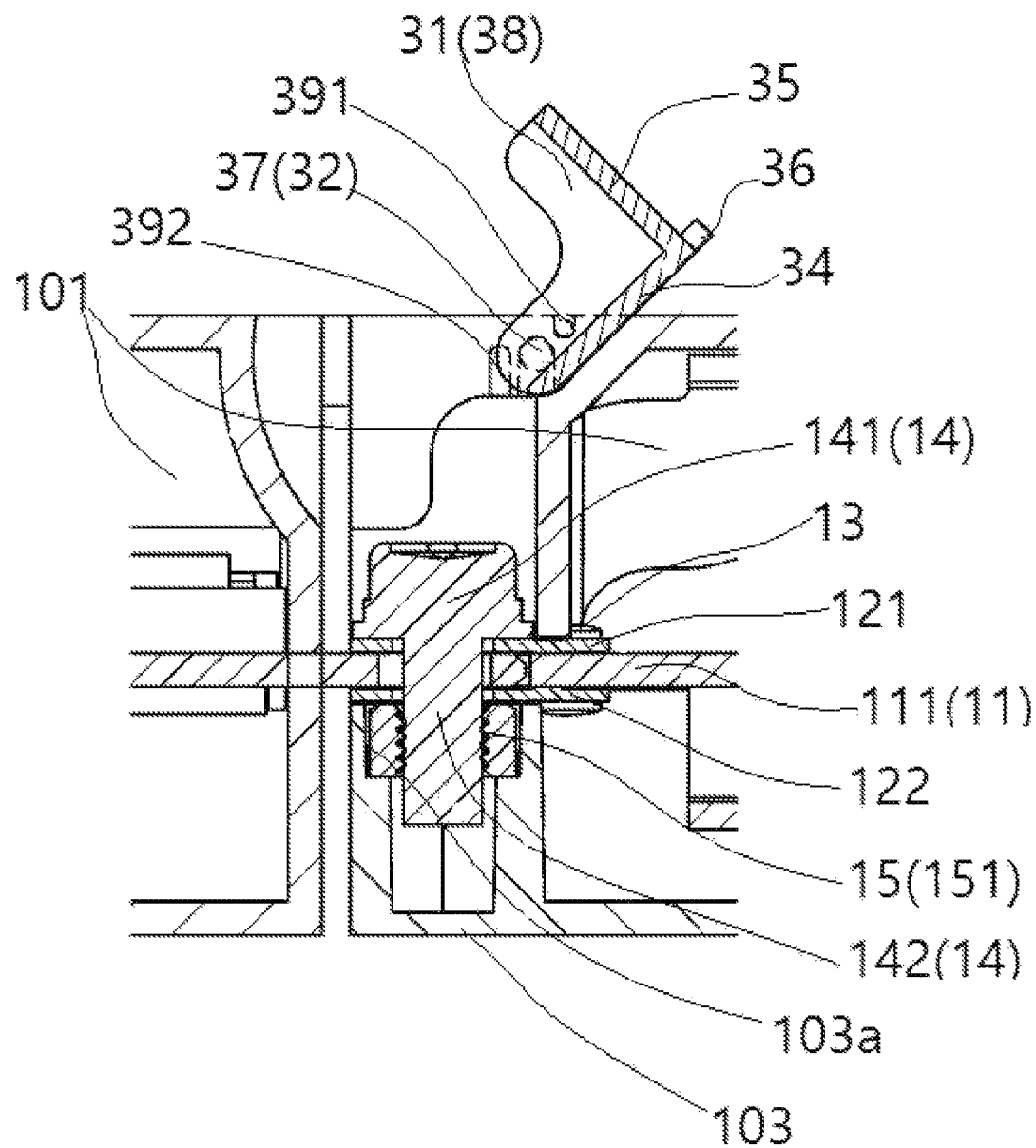
FIG. 10B is a cross-sectional side view illustrating the closed state and the opened state of the rotary cover according to the embodiment of the rotary cover of the power distribution device for a distribution board of the present invention when viewed in another direction.

Among the attached drawings, FIG. 9A is an exploded perspective view of a rotary cover according to an embodiment of the rotary cover of the power distribution device for a distribution board of the present invention, FIG. 9B is an exploded perspective view of the rotary cover according to the embodiment of the rotary cover of the power distribution device for a distribution board of the present invention when viewed in another direction, FIG. 10A is a cross-sectional side view illustrating a closed state and an opened state of the rotary cover according to the embodiment of the rotary cover of the power distribution device for a distribution board of the present invention, and FIG. 10B is a cross-sectional side view illustrating the closed state and the opened state of the rotary cover according to the embodiment of the rotary cover of the power distribution device for a distribution board of the present invention when viewed in another direction.

Among the drawings, as illustrated in FIGS. 10A and 10B, the rotary cover 30 of the power distribution device 1 for a distribution board of the present invention is opened when the second end 112 of the connection terminal 11 of the second power distribution device 1 for a distribution board, which is intended to be connected in a state in which the upper housing 101 is opened, is connected to the connection hole 124 of the first power distribution device 1 for a distribution board. The rotary cover 30 may close and protect the connected state after the connection.

As illustrated in FIGS. 9A and 9B, the rotary cover 30 includes a first surface portion 34 extending in a plate shape in the length direction, a plate-shaped second surface portion 35 connected in a "¬" shape to the first surface portion 34, and rotation surface portions 31 each formed by expanding a width of a "¬"-shaped cross-section of each of the two opposite sides of the rotary cover and configured to cover two opposite surfaces.

An opened space for protecting the terminal of the upper housing 101 is formed inside the first surface portion 34, the second surface portion 35, and the rotation surface portions 31. Slip recessed portions 38 may be formed at two opposite inner sides of the upper housing 101, and the rotation surface portions 31 are seated in the slip recessed portions 38, cover the space, and rotate while slipping. A hinge shaft groove 37 and an angle fixing groove portion 39 are formed on the slip recessed portion 38.

That is, the slip recessed portion 38 may have the angle fixing groove portion 39 configured to fix a rotation angle of the rotary cover 30 when a hinge shaft 32 rotates, and the hinge shaft groove 37 configured to axially support the hinge shaft 32. The angle fixing groove portion 39 may have a first groove portion 391 and a second groove portion 392 formed at two opposite sides based on the hinge shaft groove 37.

The rotation surface portion 31 has a stopping protrusion 33 and is seated in the first groove portion 391 or the second groove portion 392 in order to fix an opened or closed state of the rotary cover 30 while slipping and rotating along the slip recessed portion 38.

The hinge shaft groove 37 may be formed as a vertical groove so that the rotation surface portion 31 rotates while moving upward or downward in a vertical section.

As illustrated in FIGS. 10A and 10b, the rotary cover 30 of the power distribution device 1 for a distribution board of the present invention is opened when the second end 112 formed on the connection terminal 11 of the second power distribution device 1 for a distribution board, between the two power distribution devices 1 for a distribution board that are connected when the rotary cover 30 is connected to the connection hole 124 of the first power distribution device 1 for a distribution board in the state in which the upper housing 101 is opened or only the rotary cover 30 is opened. The rotary cover 30 is closed and protects the connected state after the connection. The rotary cover 30 of the power distribution device 1 for a distribution board of the present invention is closed, as illustrated in FIG. 10A, when the second ends 112 of the connection terminal 11 of the power distribution device 1 for a distribution board are completely connected to the connection holes 124 in the state in which the rotary cover 30 is opened, as illustrated in FIG. 10B. The stopping protrusion 33 is seated in the second fixing groove portion 392.

As described above, the rotary cover of the power distribution device for a distribution board of the present invention solves the problem with the protection cover means in the related art for protecting the exposed terminal opened at the upper portion of the upper housing. The rotary cover may be provided to constantly maintain an angle fixed state as the stopping protrusion 33 is seated in the first fixing groove portion 391 or the second fixing groove portion 392 of the angle fixing groove portion 39 in the opened state after the rotation at a predetermined angle.

Embodiment 4

The present embodiment is based on the entire power distribution device 1 for a distribution board of Embodiment 1, and a repeated description of some components will be omitted. The components required for the present embodiment 4 will be described again with reference to the drawings in Embodiment 1.

The connection portion safety cover 50 of the power distribution device 1 for a distribution board of the present invention may include the main circuit breaker 2 configured to receive power of the main circuit breaker, the branch circuit breakers 3 configured to distribute the power of the main circuit breaker 2 in another direction, the additional output terminal circuit breaker 3, and the power distribution device 1 for a distribution board that is connected to the branch circuit breaker 3 and the additional output terminal circuit breaker 4 and distributes the power of the main circuit breaker 1 to the branch circuit breaker 3 and the additional output terminal circuit breaker 4.

The power distribution device 1 for a distribution board of the present invention may include the upper housing 101, the lower housing 103 installed on the floor, the connection module 10 installed in the vertical direction at the side of the main circuit breaker 2 in the lower housing 103, and the safety cover 50 configured to block an exposed portion of the output terminal at the side of the vertically exposed output terminal of the upper housing 101 (the first end of the connection module).

The connection module 10 may broadly include the connection terminal 11, the connection member 12, the coupling members 13, the electrically conducting fastening member 14, and the ring-shaped nut member 15.

The connection terminal 11 has the first end 111 formed at any one of the two opposite ends, and the second end 112 formed at the other of the two opposite ends. The plate-shaped surface having a predetermined width may extend in the length direction between the first end 111 and the second end 112 of the connection terminal 11, and the plurality of coupling rivet holes 114 may be formed in the plate-shaped surface between the first end 111 and the second end 112.

The contact connection hole 113 may be formed at the side of the second end 112. The inclined surfaces 112a may be formed on the upper and lower surfaces, and the tip surface 112b may be formed at the end between the inclined surfaces 112a. The second end 112 may have the smooth insertion structure having the curved portions 112c that are easily inserted into the connection hole 124.

The connection member 12 includes the first connection member 121 coupled while covering the second end 112 of the connection terminal 11 from above to define the connection hole 124 to which the second end 112 of the connection terminal 11 is electrically connected, and the second connection member 122 coupled to support the connection terminal 11 from below to define the connection hole 124 to which the connection terminal 11 is electrically connected.

The first and second connection members 121 and 122 respectively have the two opposite edges 121a and 122a, the fastening holes 123, and the coupling holes 125 that respectively correspond to one another and are coupled to one another. The front and rear ends of each of the first and second connection members 121 and 122 may be defined as the open ends 124a and 124b. The open ends 124a and 124b may define the connection hole 124 as the first and second connection members 121 and 122 are coupled in the upward/downward direction with the first end 111 of the connection terminal 11 interposed therebetween as the coupling members 13 are coupled while penetrating the coupling holes 125.

The depth of the connection hole 124 may define 50% of the insertion/attachment length of the first end 111 and the second end 112 so that the second end 112 of the connection terminal 11 is inserted and attached.

The electrically conducting fastening member 14 penetrates the fastening holes 123 of the connection member 12 and the fastening hole 113 of the first end 111 of the connection terminal 11 and is fixedly installed by the ring-shaped nut member 15 embedded and installed in a bottom housing 103.

The electrically conducting fastening member 14 includes the stem portion 142 configured to penetrate the fastening holes 123 of the first and second connection members 121 and 122, and the head portion 141 supported by being caught by the fastening holes 123.

The ring-shaped nut member 15 has the screw hole 151 to which the stem portion 142 of the fastening member 14 is screw-coupled, and the outer edge of the ring-shaped nut member 15 is defined as a quadrangular edge.

The ring-shaped nut member 15 is embedded and fixed so that the upper portion thereof is exposed through the fastening groove portion 103a formed at a predetermined position along the outer peripheral edge of the lower housing 103.

The electrically conducting fastening member 14 is fastened and coupled to the ring-shaped nut member 15 fixed to the fastening groove portion 103a as the stem portion 142 of the electrically conducting fastening member 14 is screw-coupled to the screw hole 151 of the ring-shaped nut member 15 in the fastening groove portion 103a while sequentially passing through the fastening hole 123 of the first connection member 121, the fastening hole 113 of the connection terminal 11, and the fastening hole 123 of the second connection member 122.

Hereinafter, the safety cover 50 will be described specifically with respect to the drawings.

Figure 11:
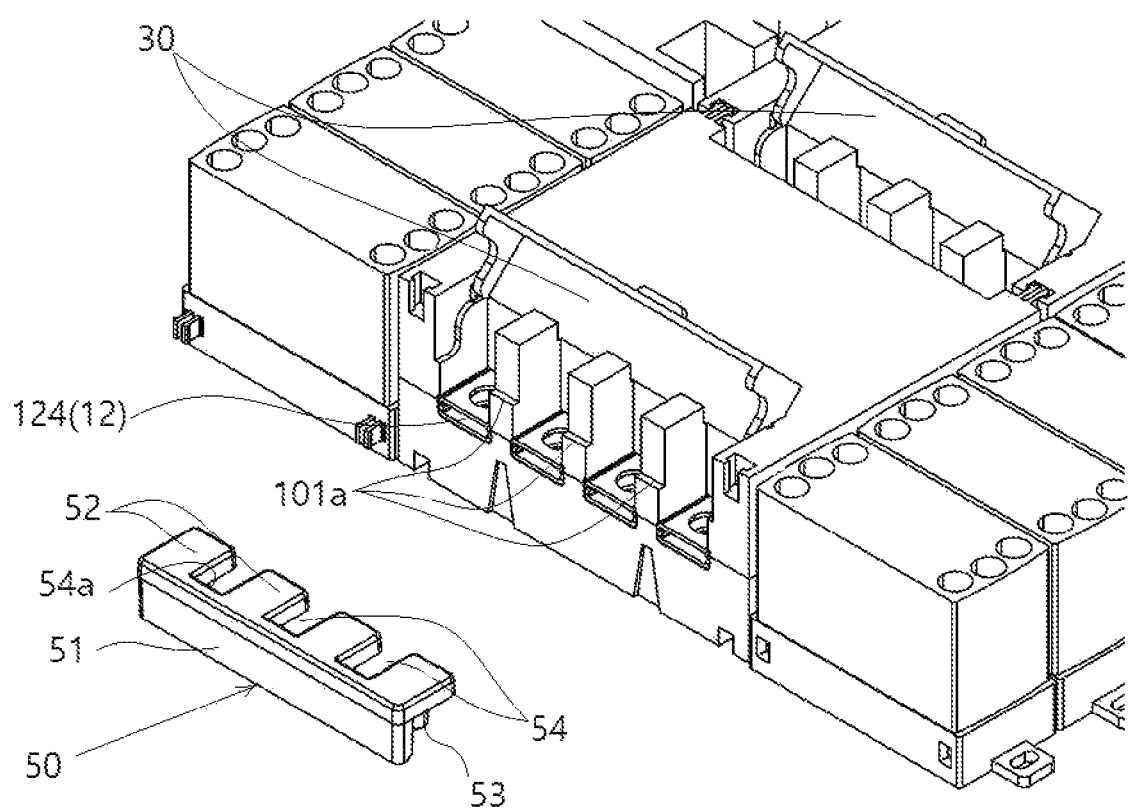
FIG. 11 is an exploded perspective view according to an embodiment of a connection portion safety cover of the power distribution device for a distribution board of the present invention.
Figure 12A:
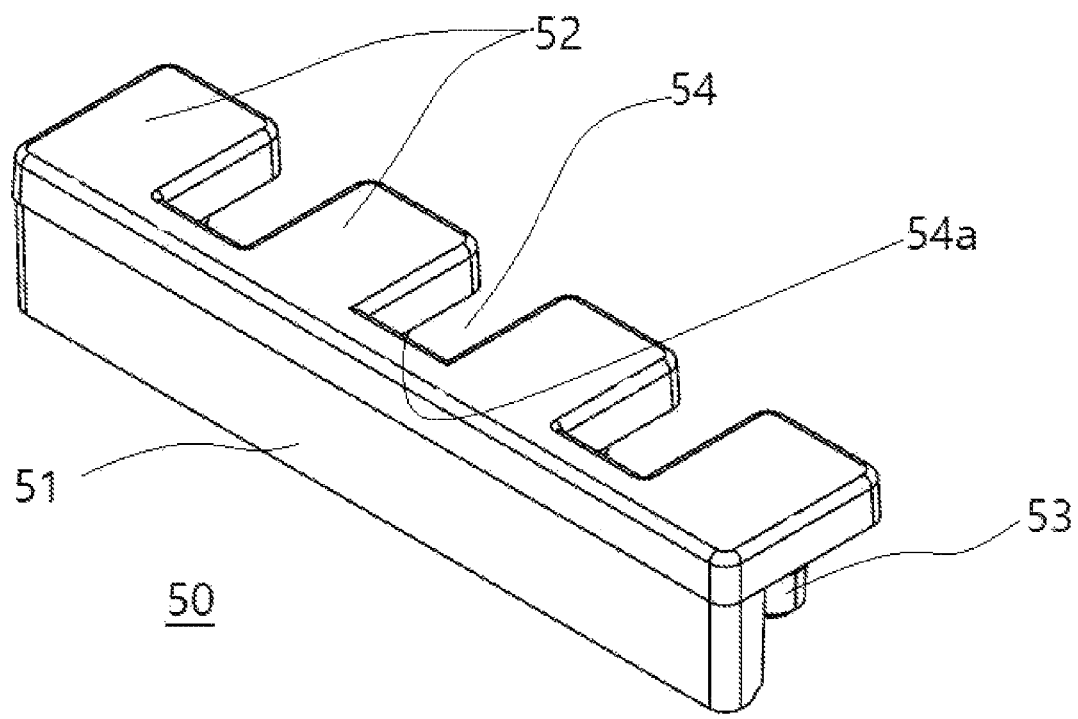
FIG. 12A is an extracted perspective view of the connection portion safety cover of the power distribution device for a distribution board of the present invention.
Figure 12B:
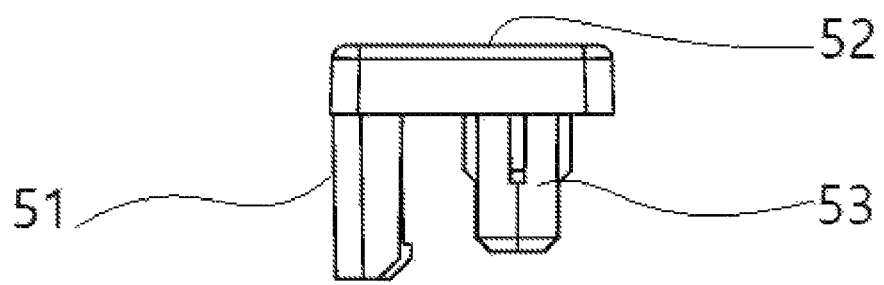
FIG. 12B is a side view of the connection portion safety cover of the power distribution device for a distribution board of the present invention.
Figure 12C:
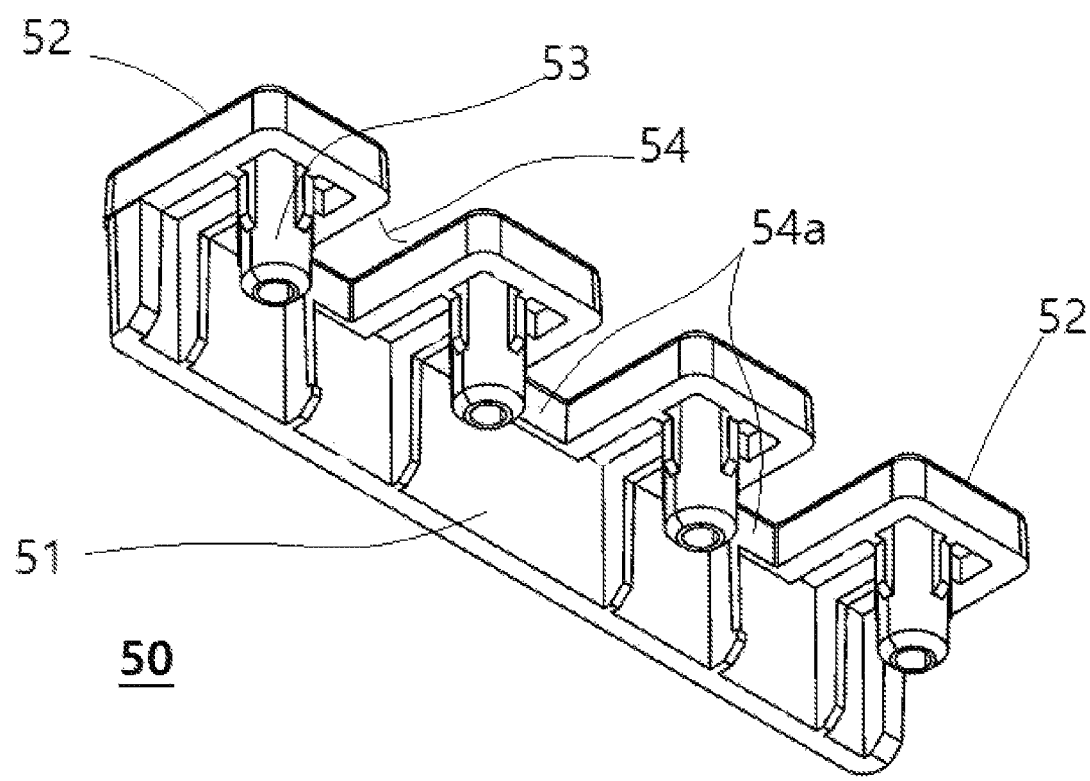
FIG. 12C is a bottom perspective cross-sectional view of the connection portion safety cover of the power distribution device for a distribution board of the present invention.
Figure 12D:
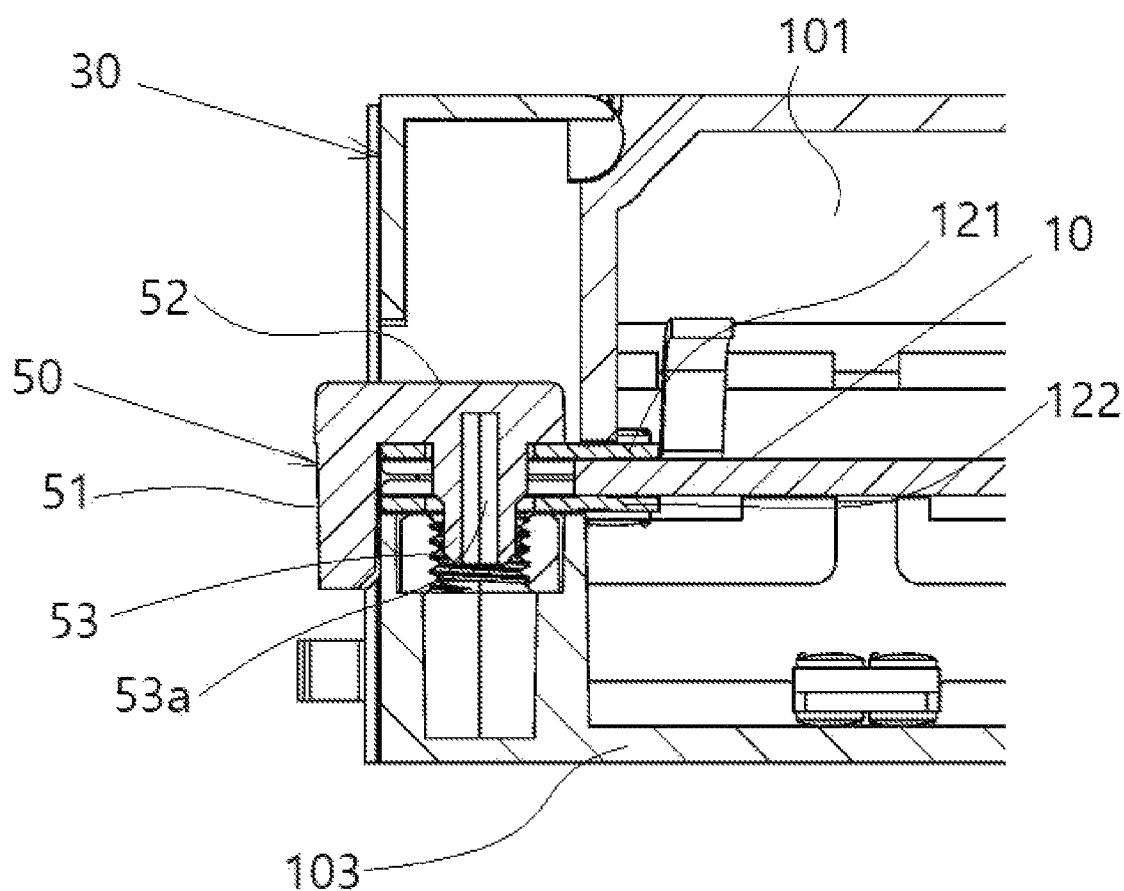
FIG. 12D is an installed cross-sectional view of the connection portion safety cover of the power distribution device for a distribution board of the present invention.

That is, among the attached drawings, FIG. 11 is an exploded perspective view according to an embodiment of a connection portion safety cover of the power distribution device for a distribution board of the present invention, FIG. 12A is an extracted perspective view of the connection portion safety cover of the power distribution device for a distribution board of the present invention, FIG. 12B is a side view of the connection portion safety cover of the power distribution device for a distribution board of the present invention, FIG. 12C is a bottom perspective cross-sectional view of the connection portion safety cover of the power distribution device for a distribution board of the present invention, and FIG. 12D is an installed cross-sectional view of the connection portion safety cover of the power distribution device for a distribution board of the present invention.

The connection portion safety cover of the power distribution device for a distribution board according to the embodiment of the present invention according to FIGS. 11, 12A, 12B, 12C, and 12D, among the drawings, includes the housing 1, the connection module 10, and the safety cover 50.

The safety cover 50 may include a front cover portion 51, upper cover portions 52, and fastening hole cover portions 53.

The front cover portion 51 is formed in a plate shape to simultaneously cover the plurality of connection holes 124 in the front surface.

The upper cover portion 52 is bent at a right angle from the front cover portion 51 and protrudes in a fork shape while having seating hole portions 54 alternately formed in a plate-shaped surface. The seating hole portion 54 has placement surfaces 54a formed to be seated on a stepped placement portion 101a of the upper housing 101.

Therefore, the upper cover portion 52 having the seating hole portions 54 formed alternately is formed in a fork shape and inserted and attached as the placement surface 54a is in close contact with and stably mounted on the stepped placement portion 101a at the front side of the upper housing 101.

In particular, as illustrated in FIGS. 12C and 12D, because the fastening hole cover portions 53 protrude downward from the bottom surface of the front cover portion 52, the fastening hole cover portions 53 are safely tightly supported by the stepped placement portion 101a while penetrating the fastening holes 123 formed in the first and second connection members 121 and 122 of the connection module 10 when fastening hole cover portions 53 are inserted and attached into the stepped placement portion 101a.

Although not illustrated, in case that the fastening member 14 is fastened to the fastening hole 123, the structure of the safety cover 50 may be implemented as the structure in which the fastening hole cover portion 53 disposed below the upper cover portion 52 is removed, and only a seating hole 53a is formed to be in close contact with the head portion 141 of the fastening member 14.

Therefore, it is possible to prevent a short circuit accident caused by inadvertent contact with the conductive member, contact with the operator, and rainwater in the opened state of the distribution board caused by the exposed terminal having no connection between the housings that constitute the power distribution device for a distribution board.

Embodiment 5

The present embodiment is based on the entire power distribution device 1 for a distribution board of Embodiment 1, and a repeated description of some components will be omitted. However, the components required for the present embodiment 5 will be described again with reference to the drawings in Embodiment 1.

That is, the power distribution device 1 for a distribution board of the present invention may include the main circuit breaker 2 configured to receive power of the main circuit breaker, the branch circuit breakers 3 configured to distribute the power of the main circuit breaker 2 in another direction, the additional output terminal circuit breaker 3, and the power distribution device 1 for a distribution board that is connected to the branch circuit breaker 3 and the additional output terminal circuit breaker 4 and distributes the power of the main circuit breaker 1 to the branch circuit breaker 3 and the additional output terminal circuit breaker 4.

The power distribution device 1 for a distribution board of the present invention may include the upper housing 101, the lower housing 103 installed on the floor, the connection module 10 installed in the vertical direction at the side of the main circuit breaker 2 in the lower housing 103, and the rotary cover 30 configured to be opened upward at the time of being connected to the output terminal at the side of the vertically exposed output terminal of the upper housing 101 (the first end of the connection module) and configured to cover and protect the lateral side after the connection.

The connection module 10 of the power distribution device 1 for a distribution board of the present invention broadly may include the connection terminal 11, the connection member 12, the coupling members 13, the electrically conducting fastening member 14, and the ring-shaped nut member 15.

The connection terminal 11 has the first end 111 formed at any one of the two opposite ends, and the second end 112 formed at the other of the two opposite ends. The plate-shaped surface having a predetermined width may extend in the length direction between the first end 111 and the second end 112 of the connection terminal 11, and the plurality of coupling rivet holes 114 may be formed in the plate-shaped surface between the first end 111 and the second end 112.

The contact connection hole 113 may be formed at the side of the second end 112. The inclined surfaces 112a may be formed on the upper and lower surfaces, and the tip surface 112b may be formed at the end between the inclined surfaces 112a. The second end 112 may have the smooth insertion structure having the curved portions 112c that are easily inserted into the connection hole 124.

The connection member 12 includes the first connection member 121 coupled while covering the second end 112 of the connection terminal 11 from above to define the connection hole 124 to which the second end 112 of the connection terminal 11 is electrically connected, and the second connection member 122 coupled to support the connection terminal 11 from below to define the connection hole 124 to which the connection terminal 11 is electrically connected.

The first and second connection members 121 and 122 respectively have the two opposite edges 121*a* and 122*a*, the fastening holes 123, and the coupling holes 125 that respectively correspond to one another and are coupled to one another. The front and rear ends of each of the first and second connection members 121 and 122 may be defined as the open ends 124*a* and 124*b*. The open ends 124*a* and 124*b* may define the connection hole 124 as the first and second connection members 121 and 122 are coupled in the upward/downward direction with the first end 111 of the connection terminal 11 interposed therebetween as the coupling members 13 are coupled while penetrating the coupling holes 125.

The depth of the connection hole 124 may define 50% of the insertion/attachment length of the first end 111 and the second end 112 so that the second end 112 of the connection terminal 11 is inserted and attached.

The electrically conducting fastening member 14 penetrates the fastening holes 123 of the connection member 12 and the fastening hole 113 of the first end 111 of the connection terminal 11 and is fixedly installed by the ring-shaped nut member 15 embedded and installed in a bottom housing 103.

The electrically conducting fastening member 14 includes the stem portion 142 configured to penetrate the fastening holes 123 of the first and second connection members 121 and 122, and the head portion 141 supported by being caught by the fastening holes 123.

The ring-shaped nut member 15 has the screw hole 151 to which the stem portion 142 of the fastening member 14 is screw-coupled, and the outer edge of the ring-shaped nut member 15 is defined as a quadrangular edge.

The ring-shaped nut member 15 is embedded and fixed so that the upper portion thereof is exposed through the fastening groove portion 103*a* formed at a predetermined position along the outer peripheral edge of the lower housing 103.

The electrically conducting fastening member 14 is fastened and coupled to the ring-shaped nut member 15 fixed to the fastening groove portion 103*a* as the stem portion 142 of the electrically conducting fastening member 14 is screw-coupled to the screw hole 151 of the ring-shaped nut member 15 in the fastening groove portion 103*a* while sequentially passing through the fastening hole 123 of the first connection member 121, the fastening hole 113 of the connection terminal 11, and the fastening hole 123 of the second connection member 122.

Hereinafter, a housing alignment connection structure of the power distribution device for a distribution board of the present invention will be described specifically with reference to the drawings.

Figure 13:
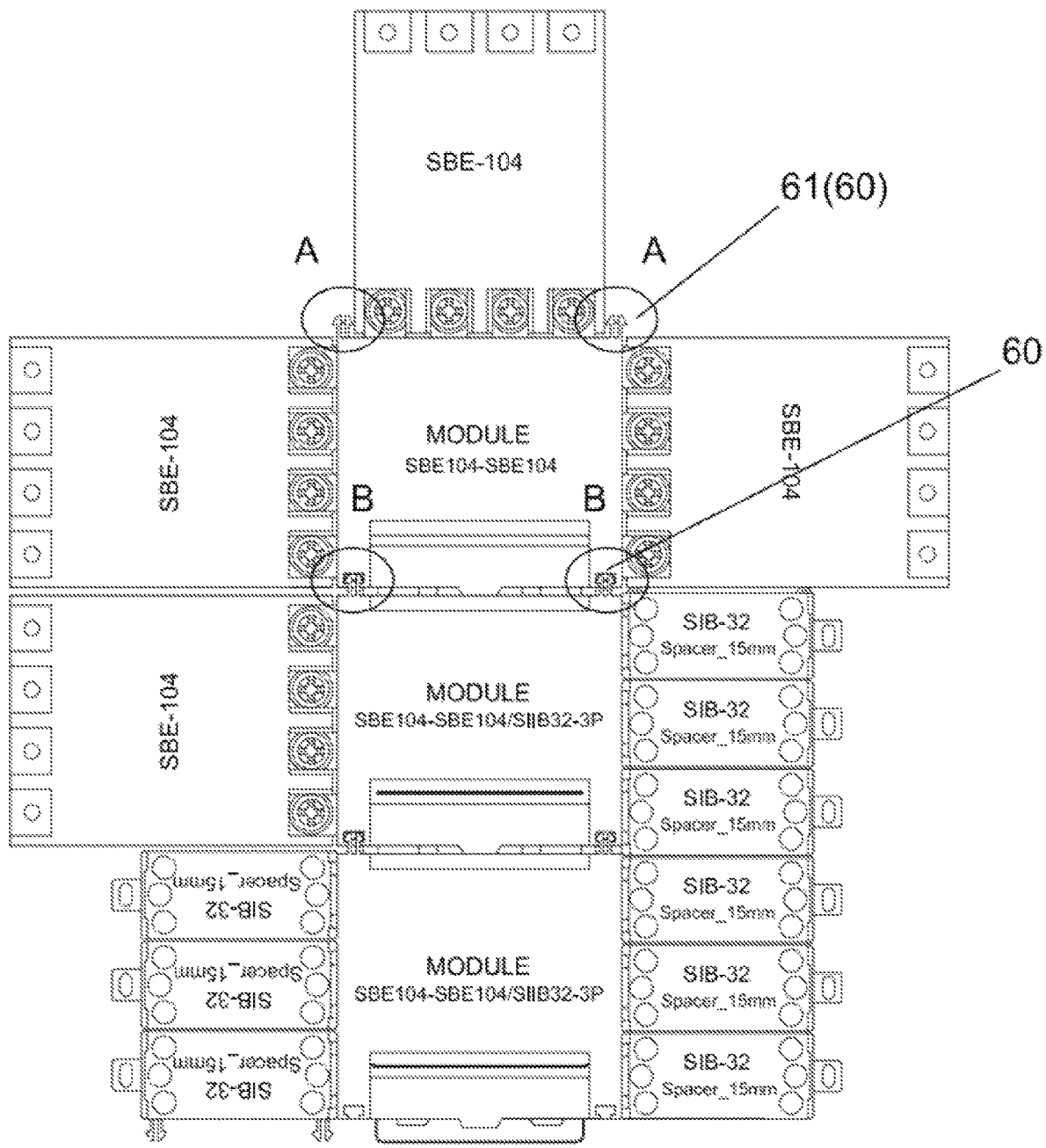
FIG. 13 is a top plan view illustrating a housing alignment connection structure of the power distribution device for a distribution board of the present invention.
Figure 14A:
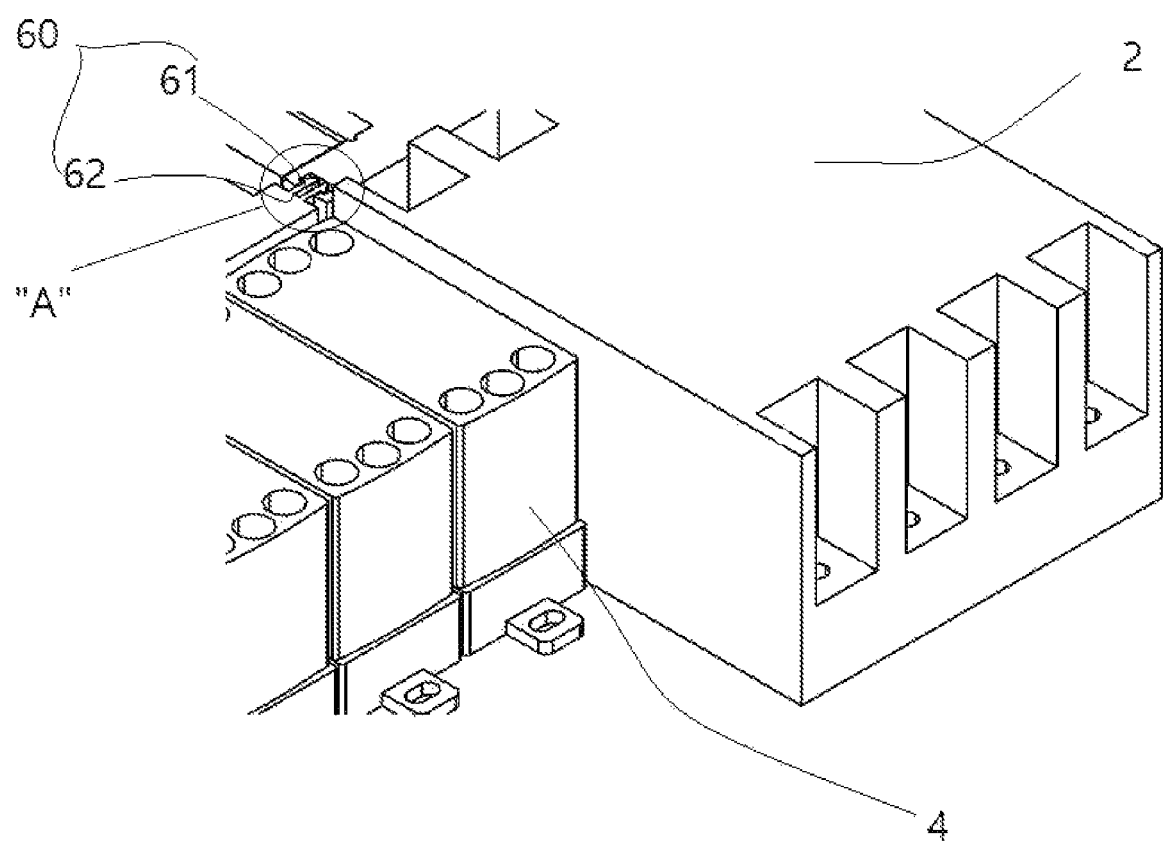
FIG. 14A is a main part view illustrating a connected state of the housing alignment connection structure of the power distribution device for a distribution board of the present invention.
Figure 14B:
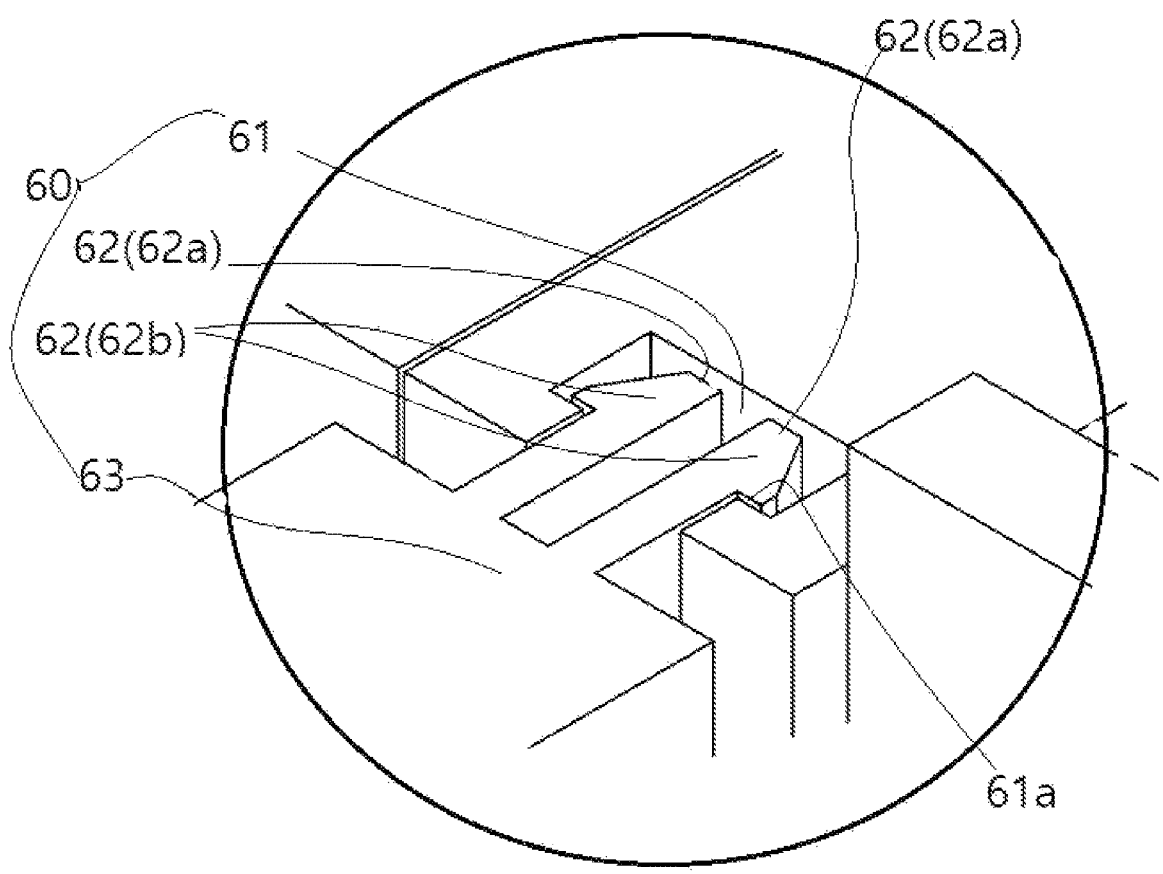
FIG. 14B is an enlarged main part view illustrating a connected state of the housing alignment connection structure of the power distribution device for a distribution board of the present invention.

Among the attached drawings, FIG. 13 is a top plan view illustrating a housing alignment connection structure of the power distribution device for a distribution board of the present invention, FIG. 14A is a main part view illustrating a connected state of the housing alignment connection structure of the power distribution device for a distribution board of the present invention, and FIG. 14B is an enlarged main part view illustrating a connected state of the housing alignment connection structure of the power distribution device for a distribution board of the present invention.

In the housing alignment connection structure of the power distribution device for a distribution board of the present invention according to the drawings, the connection holder part 60 may broadly include female connection groove portions 61 and male connection protruding portions 62.

The male connection protruding portions 62 protrude from two opposite sides of the front end of the housing 1 and have tip portions 62*a* sharply formed on a connector 63 protruding from the front end of the housing 1. The tip portions 62*a* are resiliently formed and installed side by side at an interval ("c").

The female connection members 61 are recessed at two opposite sides of the rear end of the housing 1, and the male connection protruding portions 62 are inserted and attached into the female connection members 61, such that the housing 1 are vertically and horizontally aligned.

The connection holder parts 60 of the present invention configured as described above may connect the plurality of housings 1 continuously in the vertical direction.

As illustrated in FIG. 13, the implementation of the connection holder part 60 of the present invention provides an effect of appropriately aligning the vertically connected state of the housings 1.

That is, as illustrated in FIG. 14A, the connected state of the two continuous housings 1 inside the branch housing 3 and the additional housing 4 is indicated by circular line "A" and specifically illustrated in FIG. 14B that is an enlarged view of circular line "A".

As illustrated in the drawings, when the tip portions 62*a* of the male connection protruding portions 62, which sharply protrude at the interval ("c"), are inserted into inlet portions of the female connection groove portions 61, the interval decreases, and the tip portions 62*a* are retracted inward, such that the insertion and attachment are performed. Further, the tip portions 62*a* are caught by inner projection portions 61*a* of the female connection groove portions 61 each formed in a groove shape recessed inward while being opened upward from the rear end of the housing 1. Alternatively, the tip portions 62*a* may be pushed and fitted into the female connection groove portions 61 opened from above to below the housing 1.

During a separation process, two end pieces 62*b* of the male connection protruding portions 62 exposed to the upper surface of the housing 1 may be retracted inward and separated from the opened female connection groove portions 61.

Meanwhile, the above-mentioned connection holder part 60 may be formed in a lateral surface of the housing 1 or a lateral surface of the branch housing 3, thereby implementing stable connection when the continuous connection is made for the alignment in a transverse direction that may be variously implemented. In the present embodiment, a description of specific application examples will be omitted.

While the present invention has been described above with reference to the exemplary embodiments and the drawings, those skilled in the art may variously modify and change the present invention without departing from the spirit and scope of the present invention disclosed in the claims.

The invention claimed is:

1. A power distribution device for a distribution board, the power distribution device comprising:
   a housing including an upper housing configured to protect an upper portion of the power distribution device for the distribution board, and a lower housing configured to support and protect a lower portion of the power distribution device for the distribution board;

a connection module disposed in a space in the housing and integrated with connection terminals to receive power of a main circuit breaker and a branch circuit breaker; and the connection terminal fastened to the connection module and configured to distribute power, wherein the connection module comprises:

the connection terminal having first and second ends and a plate-shaped surface having a predetermined width and extending in a length direction between the first and second ends, the plate-shaped surface, between the first and second ends, having rivet coupling holes and connection holes;

a connection member including first and second connection members coupled to cover the second end of the connection terminal in an upward/downward direction so that the second end has a connecting and electrically conducting connection hole, the first and second connection members having two opposite edges corresponding to each other, open ends having the connection holes, fastening holes, and coupling holes;

coupling members configured to fix and penetrate the coupling holes of the connection member and the rivet coupling holes of the connection terminal;

an electrically conducting fastening member fastened while penetrating the connection hole of the second end and the upper and lower fastening holes and configured to allow the second end of the connection terminal to be inserted into the connection hole; and a ring-shaped nut member fixed to a fastening groove portion of the lower housing so that the electrically conducting fastening member is fastened and fixed to the ring-shaped nut member while penetrating the fastening holes and the connection hole.

2. A power distribution device for a distribution board, the power distribution device comprising:

a housing including an upper housing configured to protect an upper portion of the power distribution device for the distribution board, and a lower housing configured to support and protect a lower portion of the power distribution device for the distribution board;

a connection module disposed in a space in the housing and integrated with connection terminals to receive power of a main circuit breaker and a branch circuit breaker;

the connection terminal fastened to the connection module and configured to distribute power; and a rotary cover configured to be rotated and opened when a second end of the connection terminal of the power distribution device for the distribution board is connected to a connection hole of another power distribution device for the distribution board in a state in which the housing is opened;

wherein the rotary cover comprises:

a first surface portion extending in a plate shape in a length direction;

a second surface portion having a plate shape and connected in a "¬" shape to the first surface portion;

"¬"-shaped rotation surface portions configured to cover two opposite surfaces of each of the first and second surface portions; and hinge shafts on which two opposite surfaces of the rotation surface portion are axially fixed to be rotatable, and wherein each of rotation surface portions of the lower housing comprises;

a hinge shaft groove in which a stopping protrusion supports an opened or closed state of the rotary cover while moving upward or downward; and an angle fixing groove portion having first and second groove portions formed at two opposite sides in an upward/downward direction based on the hinge shaft groove.

3. The power distribution device of claim 1, comprising:

a connection holder part comprising:

male connection protruding portions having tip portions sharply formed on supports protruding from two opposite sides of a front end of the housing, the male connection protruding portions having end pieces installed side by side; and female connection groove portions recessed at two opposite sides of a rear end of the housing so as to be opened upward and coupled as projection portions of the male connection protruding portions inserted and attached into the female connection groove portions.

* * * * *